United States Patent
Dubey

(10) Patent No.: US 12,487,823 B1
(45) Date of Patent: Dec. 2, 2025

(54) WRITE BUFFER CIRCUIT SUPPORTING STORE RELEASE COMBINING OF STORE OPERATIONS FROM A MEMORY ACCESS STAGE OF A PROCESSOR INSTRUCTION PIPELINE FOR EFFICIENT PROCESSING OF STORE RELEASE INSTRUCTIONS, AND RELATED METHODS

(71) Applicant: QUALCOMM Incorporated, San Diego, CA (US)

(72) Inventor: Sandeep Kumar Dubey, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/830,104

(22) Filed: Sep. 10, 2024

(51) Int. Cl.
*G06F 9/30* (2018.01)
*G06F 13/16* (2006.01)

(52) U.S. Cl.
CPC ...... *G06F 9/30043* (2013.01); *G06F 9/30047* (2013.01); *G06F 13/1673* (2013.01)

(58) Field of Classification Search
CPC .................................................. G06F 9/30043
See application file for complete search history.

(56) References Cited

U.S. PATENT DOCUMENTS

| | | | |
|---|---|---|---|
| 10,228,951 B1 | 3/2019 | Kothari et al. | |
| 2012/0047332 A1* | 2/2012 | Bannon | G06F 12/0804 711/135 |
| 2015/0317158 A1* | 11/2015 | Ashcraft | G06F 9/30043 711/154 |
| 2018/0165199 A1* | 6/2018 | Brandt | G06F 9/30043 |
| 2019/0163475 A1 | 5/2019 | King | |
| 2020/0057640 A1* | 2/2020 | Dunham | G06F 9/30087 |
| 2021/0349823 A1 | 11/2021 | Karm et al. | |
| 2022/0358045 A1* | 11/2022 | Favor | G06F 12/1036 |
| 2024/0037036 A1 | 2/2024 | Dechene et al. | |

FOREIGN PATENT DOCUMENTS

CN        114217855 A      3/2022

* cited by examiner

*Primary Examiner* — Michael J Metzger
(74) *Attorney, Agent, or Firm* — W&T

(57) ABSTRACT

Write buffer circuit supporting store release combining of store operations from a memory access stage of a processor instruction pipeline for efficient processing of store release instructions, and related methods. The write buffer circuit is interfaced with an instruction pipeline of a processor to receive and commit (write data) executed store instructions to memory. The write buffer circuit allows launching of store release instructions from a store queue (STQ) to a write combining buffer (WCB) even if pending, older store instructions are not yet committed to non-cacheable memory. The write buffer circuit is configured to delay release of store release instructions from the WCB for their data to be written to non-cacheable memory until any pending, older store instructions have been committed. This facilitates combining of address related store-release instructions in the WCB that can be written to memory in a single write operation.

39 Claims, 6 Drawing Sheets

WRITE BUFFER CIRCUIT SUPPORTING STORE RELEASE COMBINING OF STORE OPERATIONS FROM A MEMORY ACCESS STAGE OF A PROCESSOR INSTRUCTION PIPELINE FOR EFFICIENT PROCESSING OF STORE RELEASE INSTRUCTIONS, AND RELATED METHODS

FIELD OF THE DISCLOSURE

The field of the disclosure relates to processors, and more particularly to processing of store instructions in an instruction pipeline of a processor to perform a store operation.

BACKGROUND

Instruction pipelining is a processing technique whereby the throughput of instructions being executed by a processor in a processor-based system may be increased by splitting the handling of each instruction into a series of steps. These steps are executed in one or more instruction pipelines each composed of multiple stages in an instruction processing circuit in a processor. One common stage of an instruction pipeline is a memory access stage. The memory access stage of the instruction pipeline includes a memory access circuit that is configured to handle memory operations (e.g., loads and stores) resulting from memory operation instructions (e.g., load and store instructions) that have been executed in prior execution stages of the instruction pipeline. If the processor is as an out-of-order processor, the processor is capable of executing memory access instructions out-of-order and providing such executed memory access instructions to the memory access circuit in an execution order that is not necessarily in their original fetch order.

For executed store instructions, the memory access circuit is configured to write (i.e., commit) data to memory at a target address specified by the store instruction. To facilitate the writing of data for executed store instructions, the memory access circuit of the instruction pipeline of the processor is configured to interface with a write buffer circuit that is interfaced with a memory system of the processor-based system. The write buffer circuit may be provided in a memory management unit (MMU) or memory controller in a processor-based system as examples. The write buffer circuit is configured to facilitate writing of data for executed store instructions to memory. For example, the write buffer circuit includes a store queue that is configured to queue store instructions (e.g., a target address and the data to be written) in an order to be processed for their data to be written to the memory system. A queued store instruction may be processed for its data to be written to cacheable memory of the memory system or non-cacheable memory (e.g., last level cache (LLC) memory and/or system memory) of the memory system. If the data from a store instruction is to be written to cacheable memory, and the memory address of the data to be written is in an exclusive cache state, the store instruction is launched from the store queue into cache memory for its data to be written to cache memory. However, if the data from a store instruction is to be written to non-cacheable memory, the store instruction is launched into a write combining buffer for possible combining with other store instructions that have a target address to the same block of memory of a resolution that can be written in a single write transaction (a cache line or a memory burst) for efficiency purposes. The data is then written to the non-cacheable memory in a process that is slower than writing data to cacheable memory. Thus, a read hazard can occur if another processor or CPU reads data at a memory address in the same memory address as the target address of a pending store operation whose data has not yet been written to memory in an observable (i.e., readable) manner.

To solve this issue, an instruction set architecture (ISA) for the processor can be designed to support a "store with release" ("store release") instruction. A store release instruction is an instruction calling for data to be written to memory only after all other pending, older store instructions to cacheable and non-cacheable memory have been committed (i.e., completed) with their written data observable (i.e., readable). Thus, a store release instruction has semantics that can be recognized by the write buffer circuit to enforce that processing of all pending, older store instructions are completed (i.e., their data written to memory being observable) before a new store release instruction is processed and its data written to memory. For example, a programmer may specifically use a store release instruction in program code in combination with load-acquire instructions to protect critical sections of program code to ensure that accesses made within the critical code section are not reordered outside of the critical section. To enforce a store release instruction not being processed before data is written and observable for all pending, older store instructions, the write buffer circuit is configured to not launch a store release instruction from the store queue to the write combining buffer until all pending, older store instructions have been committed.

Thus, use of store release instructions can reduce store instruction throughput performance in the instruction pipeline, because a store release instruction cannot be launched into the write combining buffer to write data to non-cacheable memory until all pending, older store instructions have been committed and its written data observable. Thus, the write combining buffer will be empty when all the pending, older store instructions have been committed before a next store release instruction scheduled to be launched from the store queue, can be launched into the write combining buffer to be processed. A next store release instruction must be first launched into the write combining buffer before it can be processed and its data written to non-cacheable memory, thus adding a pipeline bubble in the instruction pipeline. The write buffer circuit is not able to go ahead and "pipeline" the launch of the next store release instruction into the write combining buffer while there are pending, older store instructions not yet committed. This pipeline bubble present in the instruction pipeline due to the delay in launching store release instructions into a write combining buffer of the write buffer circuit while there are pending, older store instructions being processed can be exacerbated when a large number of store release instructions are used in program code. This delay has a reduced performance impact if the store release instruction can be written to cacheable memory as compared to non-cacheable memory as cacheable memory can be prefetched.

SUMMARY OF THE DISCLOSURE

Aspects disclosed herein include a write buffer circuit supporting store release combining of store operations from a memory access stage of a processor instruction pipeline for efficient processing of store release instructions. Related methods of the write buffer circuit performing store release combining are also disclosed. The instruction pipeline includes a memory access circuit in a memory access stage that is configured to process executed memory access instructions based on a target address resolved by execution of the memory access instruction in the instruction pipeline. The memory access circuit is interfaced with a write buffer circuit configured to interface with a memory system to write the results of an executed store instruction back into memory, which may be cacheable memory (e.g., a level 1 cache memory, a level 2 shared cache memory) or non-cacheable memory (e.g., a last level cache (LLC) memory and/or a system memory). The write buffer circuit includes a store queue (STQ) configured to store pending executed store instructions in a received order to be processed for their data to be written back to memory. The store instructions in the STQ that call for data to be written into cacheable memory are launched from the STQ in their queued order to be stored into cacheable memory. The store instructions in the STQ that call for data to be written into non-cacheable memory are launched into a write combining buffer (WCB) for possible combining in the event that multiple store instructions in the WCB have target addresses to the same memory block of a resolution that can be written in a single write operation (e.g., a cache line size or memory burst transaction). In this manner, such combined store instructions can be released for their data to be written into non-cacheable memory in a single write operation for increased efficiency. Both store instructions that are combined in the WCB and store instructions that are not combinable in the WCB are processed in order for their write data to be written to non-cacheable memory.

In exemplary aspects, to avoid the need for the write buffer circuit to delay launching a store release instruction queued in the STQ to the WCB until all pending, older store instructions have been committed, the write buffer circuit is configured to allow store release instructions to be launched from the STQ to the WCB even if there are pending, older store instructions not yet committed with their written data observable from memory. To accomplish this, the write buffer circuit is configured to delay the release of store release instructions from the WCB for their write data to be written to non-cacheable memory until any pending, older store instructions have been committed (i.e., their data written to cacheable and non-cacheable memory and observable). This can avoid a pipeline bubble in the write buffer circuit, and thus the store instruction components of the memory access circuit of the instruction pipeline by the WCB being empty and having to be filled with a next store release instruction first before the store release instruction can be processed. The next store release instruction can already be present in the WCB when the last of any pending, older store instructions are committed for the next store release instruction to then be processed to have its data written to non-cacheable memory. This avoids a pipeline bubble in the write buffer circuit that would otherwise result from the WCB being forced to be empty when the next store release instruction in the STQ is to be processed.

Further, another benefit of the write buffer circuit being configured to allow store release instructions to be launched from the STQ to the WCB even if there are pending, older store instructions not yet committed, is that this allows combining of multiple store release instructions. That is, multiple store release instructions that are launched into the WCB and have target addresses to the same memory block of a resolution that can be written in a single write operation can be combined to write their data to non-cacheable memory as a single write operation. In this manner, like non-release store instructions that do not include release semantics that are eligible to be combined in the WCB, store release instructions are also eligible to be combined in the WCB for greater efficiency of processing store release instructions in the write buffer circuit. Once any pending, older store instructions have been committed, a next store release instruction (or next combined store release instruction) can be released from the WCB to be processed for its data to be written to non-cacheable memory without additional delay in having to first launch the next store release instruction from the STQ to the WCB. This also releases storage pressure on the STQ in the write buffer circuit, because the STQ may not have to be designed of a larger size to be capable of storing a larger number of store instructions that must account for store release instructions that would not be launchable into the WCB until any pending, older store instructions have been committed. In other words, the array size of the STQ and the WCB can be sized based on a cooperate ability of the write buffer circuit to utilize both the STQ and the WCB for queuing store release instructions, because the STQ and the WCB can both be utilized for store release instructions even with the presence of pending, older store instructions to be written to memory.

Also, in another exemplary aspect, the write buffer circuit is configured to release the oldest store instruction in the WCB for its data to be written to non-cacheable memory. If the oldest store instruction in the WCB is a store release instruction, it cannot be released for its data to be written to non-cacheable memory until any pending, older store instructions being processed to have data written to both cacheable and non-cacheable memory have been committed with the written data observable. If the oldest store instruction in the WCB is a not store release instruction, it can be released for its data to be written to non-cacheable memory regardless of whether there are pending, older store instructions whose data has not yet been written to cacheable and non-cacheable memory.

In another exemplary aspect, the write buffer circuit is configured to only be able to combine a next store release instruction in the WCB with another, older store release instruction that has a target address to the same memory block writable with a single write operation in the WCB, if the existing store release instruction is the youngest store instruction in the WCB. Otherwise, a new entry in the WCB is allocated to the next store release instruction to be the youngest store instruction to remain in order behind the existing, older store instructions in the WCB. This is because it may be required for all older store instructions in the WCB to be committed before the younger, next store release instruction is processed to enforce the release requirements of the younger, next store release instruction.

In another exemplary aspect, when a next store release instruction is launched from the STQ to the WCB, all entries in the WCB are closed except the entry that is being merged with an older, store release instruction or the new entry allocated with the next store release instruction. In this manner, new store instructions cannot be launched into the WCB until the next store release instruction is combined with an existing entry or placed into a new allocated entry in the WCB, so that the order of the store release instructions in the WCB is maintained. The entries in the WCB can be reopened once the next store release instruction is combined with an existing entry or placed into a new allocated entry in the WCB.

In this regard, in one exemplary aspect, a write buffer circuit in a processor-based system is provided. The write buffer circuit comprises a store queue (STQ) configured to store a plurality of store instructions received from a processor, each of the plurality of store instructions comprising data to be written to a memory system. The write buffer circuit also comprises a write combining buffer (WCB) comprising a plurality of combining buffer entries. The write buffer circuit is configured to: launch a next store instruction of the plurality of store instructions from the STQ; determine if the next store instruction is to be written to a non-cacheable memory in the memory system; and in response to determining the next store instruction is to be written to the non-cacheable memory, launch the next store instruction as a launched store instruction to the WCB. The WCB is configured to store the launched store instruction in a combining buffer entry of the plurality of combining buffer entries. The write buffer circuit is further configured to: determine if a next launched store instruction in a combining buffer entry of the plurality of combining buffer entries is a store release instruction; and in response to determining the next launched store instruction is a store release instruction: release the next launched store instruction as a store release instruction in the WCB to the memory system as a next pending store instruction for its data to be written to the non-cacheable memory, in response to lack of presence of a pending store instruction to be written to the memory system.

In another exemplary aspect, a method of combining store release instructions to be written to memory in a processor-based system is provided. The method comprises storing a plurality of store instructions received from an instruction processing circuit of a processor in a store queue (STQ), each of the plurality of store instructions comprising data to be written to a memory system. The method also comprises launching a next store instruction of the plurality of store instructions from the STQ. The method also comprises determining if the next store instruction is to be written to a non-cacheable memory in the memory system. The method also comprises launching the next store instruction as a launched store instruction to a write combining buffer (WCB) in response to determining the next store instruction is to be written to the non-cacheable memory. The method also comprises storing the launched store instruction in a combining buffer entry of a plurality of combining buffer entries in the WCB. The method also comprises determining if a next launched store instruction in a combining buffer entry of the plurality of combining buffer entries is a store release instruction. The method also comprises in response to determining the next launched store instruction is a store release instruction, releasing the next launched store instruction as a store release instruction in the WCB to the memory system as a next pending store instruction for its data to be written to the non-cacheable memory, in response to lack of presence of a pending store instruction to be written to the memory system.

In another exemplary aspect, a processor-based system is provided. The processor-based system comprises a processor, comprising: an instruction processing circuit configured to: fetch a plurality of instructions from an instruction memory, the plurality of instructions comprising a plurality of store instructions each comprising data to be written to a memory system; execute the plurality of store instructions into a plurality of executed store instructions; and communicate the plurality of executed store instructions to a write buffer circuit. The memory system comprises a cacheable memory and a non-cacheable memory. The write buffer circuit comprises a store queue (STQ) configured to: store the plurality of executed store instructions; and a write combining buffer (WCB) comprising a plurality of combining buffer entries. The write buffer circuit is configured to: launch a next executed store instruction of the plurality of executed store instructions from the STQ; determine if the next executed store instruction is to be written to the non-cacheable memory in the memory system; and in response to determining the next executed store instruction is to be written to the non-cacheable memory, launch the next executed store instruction as a launched store instruction to the WCB. The WCB is configured to: store the launched store instruction in a combining buffer entry of the plurality of combining buffer entries. The write buffer circuit is further configured to: determine if a next launched store instruction in a combining buffer entry of the plurality of combining buffer entries is a store release instruction; and in response to determining the next launched store instruction is a store release instruction: release the next launched store instruction as a store release instruction in the WCB to the memory system as a next pending store instruction for its data to be written in the non-cacheable memory, in response to lack of presence of a pending store instruction to be written to the memory system. The memory system is configured to write the released next pending store instruction to the non-cacheable memory.

DETAILED DESCRIPTION

Figure 1:
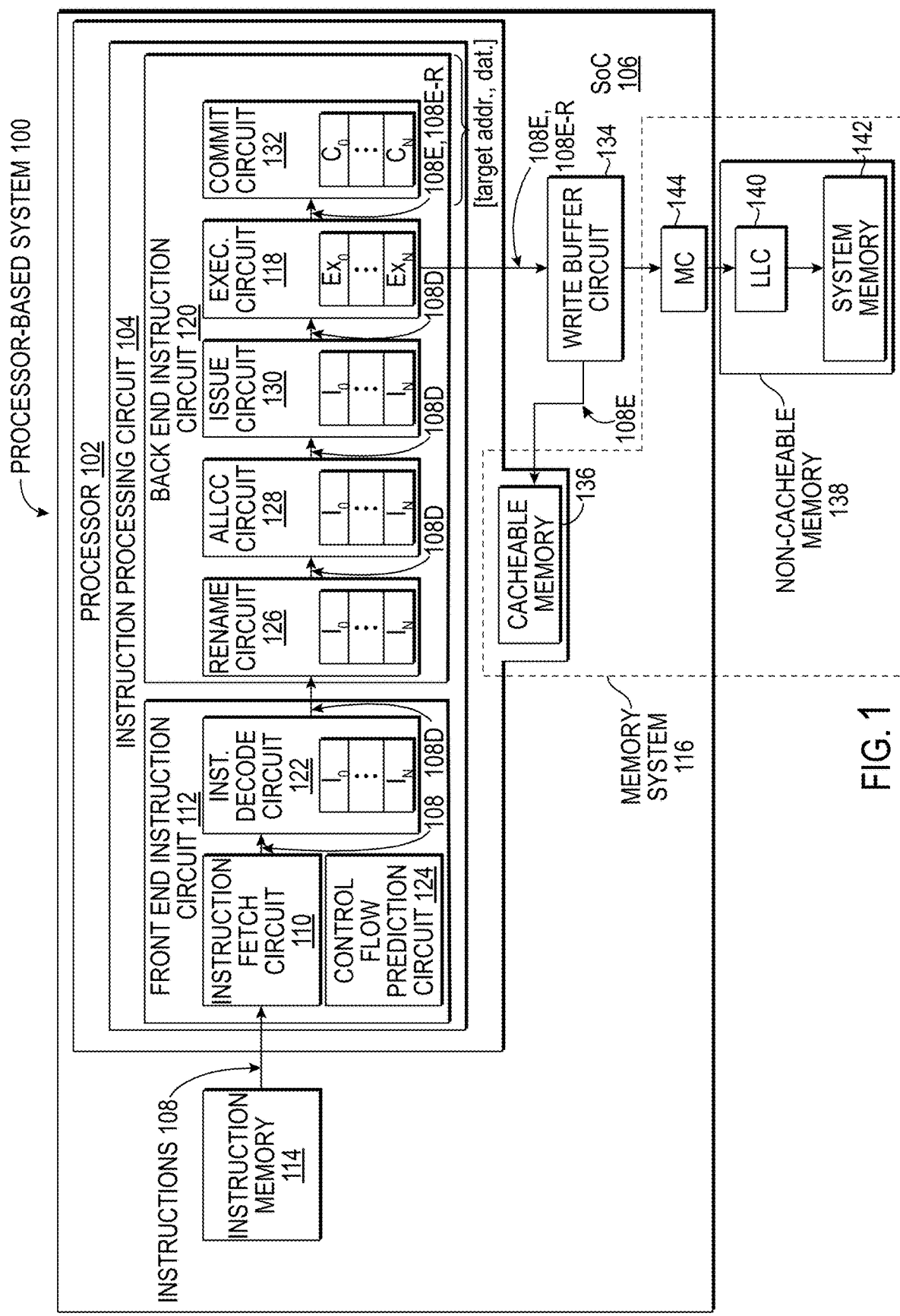
FIG. 1 is a block diagram of an exemplary processor that can be provided in a processor-based system, wherein the processor includes an instruction processing circuit that includes one or more instruction pipelines, wherein the instruction processing circuit includes a memory access stage configured to process memory access instructions and interface with a write buffer circuit to write data for storing instructions to memory.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include a write buffer circuit supporting store release combining of store operations from a memory access stage of a processor instruction pipeline for efficient processing of store release instructions. Related methods of the write buffer circuit performing store release combining are also disclosed. The instruction pipeline includes a memory access circuit in a memory access stage that is configured to process executed memory access instructions based on a target address resolved by execution of the memory access instruction in the instruction pipeline. The memory access circuit is interfaced with a write buffer circuit configured to interface with a memory system to write the results of an executed store instruction back into memory, which may be cacheable memory (e.g., a level 1 cache memory, a level 2 shared cache memory) or non-cacheable memory (e.g., a last level cache (LLC) memory and/or a system memory). The write buffer circuit includes a store queue (STQ) configured to store pending executed store instructions in a received order to be processed for their data to be written back to memory. The store instructions in the STQ that call for data to be written into cacheable memory are launched from the STQ in their queued order to be stored into cacheable memory. The store instructions in the STQ that call for data to be written into non-cacheable memory are launched into a write combining buffer (WCB) for possible combining in the event that multiple store instructions in the WCB have target addresses to the same memory block of a resolution that can be written in a single write operation (e.g., a cache line size or memory burst transaction). In this manner, such combined store instructions can be released for their data to be written into non-cacheable memory in a single write operation for increased efficiency. Both store instructions that are combined in the WCB and store instructions that are not combinable in the WCB are processed in order for their write data to be written to non-cacheable memory.

In exemplary aspects, to avoid the need for the write buffer circuit to delay launching a store release instruction queued in the STQ to the WCB until all pending, older store instructions have been committed, the write buffer circuit is configured to allow store release instructions to be launched from the STQ to the WCB even if there are pending, older store instructions not yet committed with their written data observable from memory. To accomplish this, the write buffer circuit is configured to delay the release of store release instructions from the WCB for their write data to be written to non-cacheable memory until any pending, older store instructions have been committed (i.e., their data written to cacheable and non-cacheable memory and observable). This can avoid a pipeline bubble in the write buffer circuit, and thus the store instruction components of the memory access circuit of the instruction pipeline by the WCB being empty and having to be filled with a next store release instruction first before the store release instruction can be processed. The next store release instruction can already be present in the WCB when the last of any pending, older store instructions are committed for the next store release instruction to then be processed to have its data written to non-cacheable memory. This avoids a pipeline bubble in the write buffer circuit that would otherwise result from the WCB being forced to be empty when the next store release instruction in the STQ is to be processed.

Further, another benefit of the write buffer circuit being configured to allow store release instructions to be launched from the STQ to the WCB even if there are pending, older store instructions not yet committed, is that this allows combining of multiple store release instructions. That is, multiple store release instructions that are launched into the WCB and have target addresses to the same memory block of a resolution that can be written in a single write operation can be combined to write their data to non-cacheable memory as a single write operation. In this manner, like non-release store instructions that do not include release semantics that are eligible to be combined in the WCB, store release instructions are also eligible to be combined in the WCB for greater efficiency of processing store release instructions in the write buffer circuit. Once any pending, older store instructions have been committed, a next store release instruction (or next combined store release instruction) can be released from the WCB to be processed for its data to be written to non-cacheable memory without additional delay in having to first launch the next store release instruction from the STQ to the WCB. This also releases storage pressure on the STQ in the write buffer circuit, because the STQ may not have to be designed of a larger size to be capable of storing a larger number of store instructions that must account for store release instructions that would not be launchable into the WCB until any pending, older store instructions have been committed. In other words, the array size of the STQ and the WCB can be sized based on a cooperate ability of the write buffer circuit to utilize both the STQ and the WCB for queuing store release instructions, because the STQ and the WCB can both be utilized for store release instructions even with the presence of pending, older store instructions to be written to memory.

Figure 2:
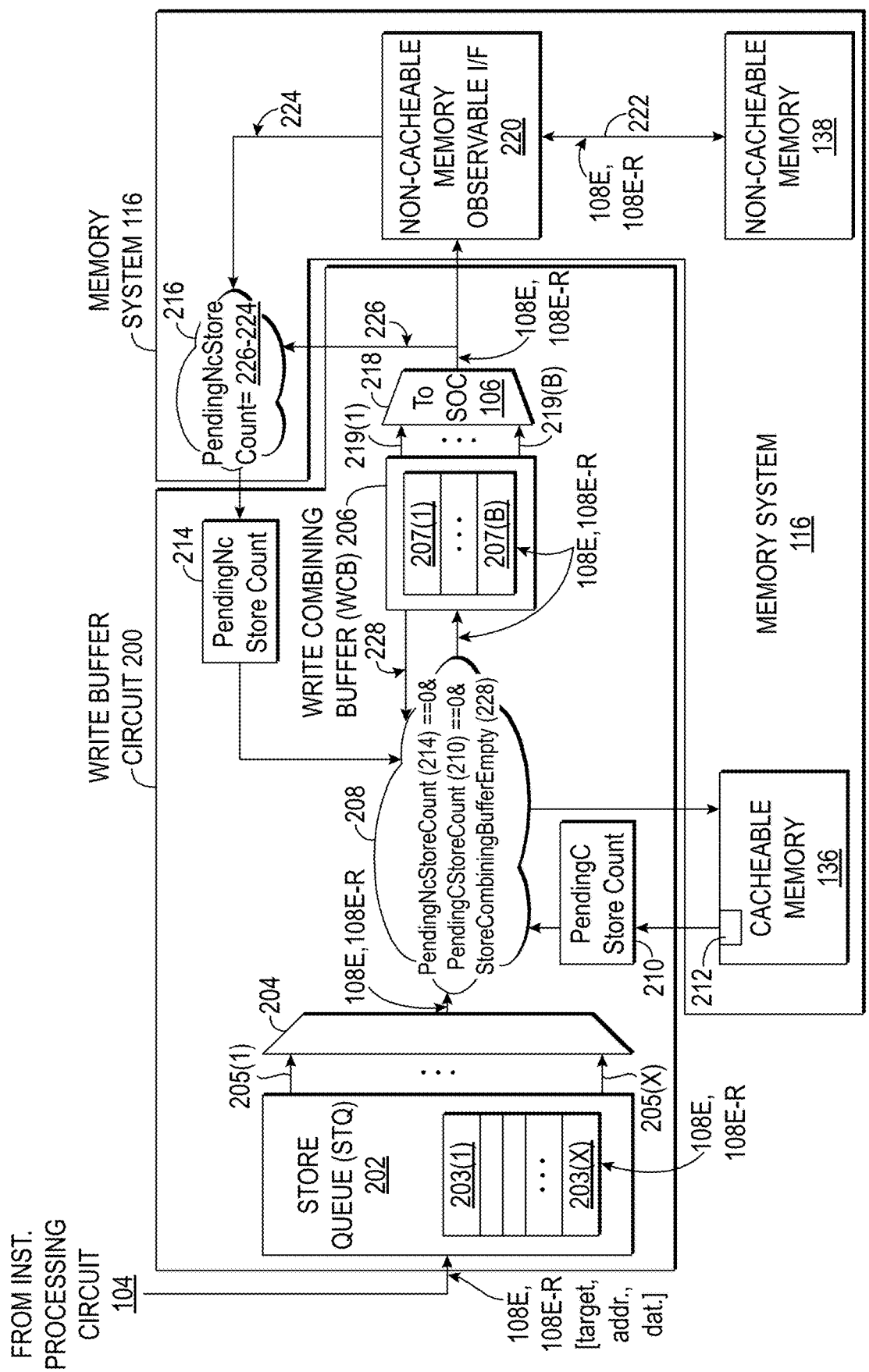
FIG. 2 is a block diagram of an exemplary write buffer circuit that can be interfaced to a memory access stage of an instruction processing circuit of the processor in FIG. 1, wherein the write buffer circuit is configured to queue store instructions to be committed in a store queue (STQ), and then only release a queued store release instruction from the STQ into a write combining buffer (WCB) in response to there being no pending older, store instructions not yet committed to memory.
Figure 3:
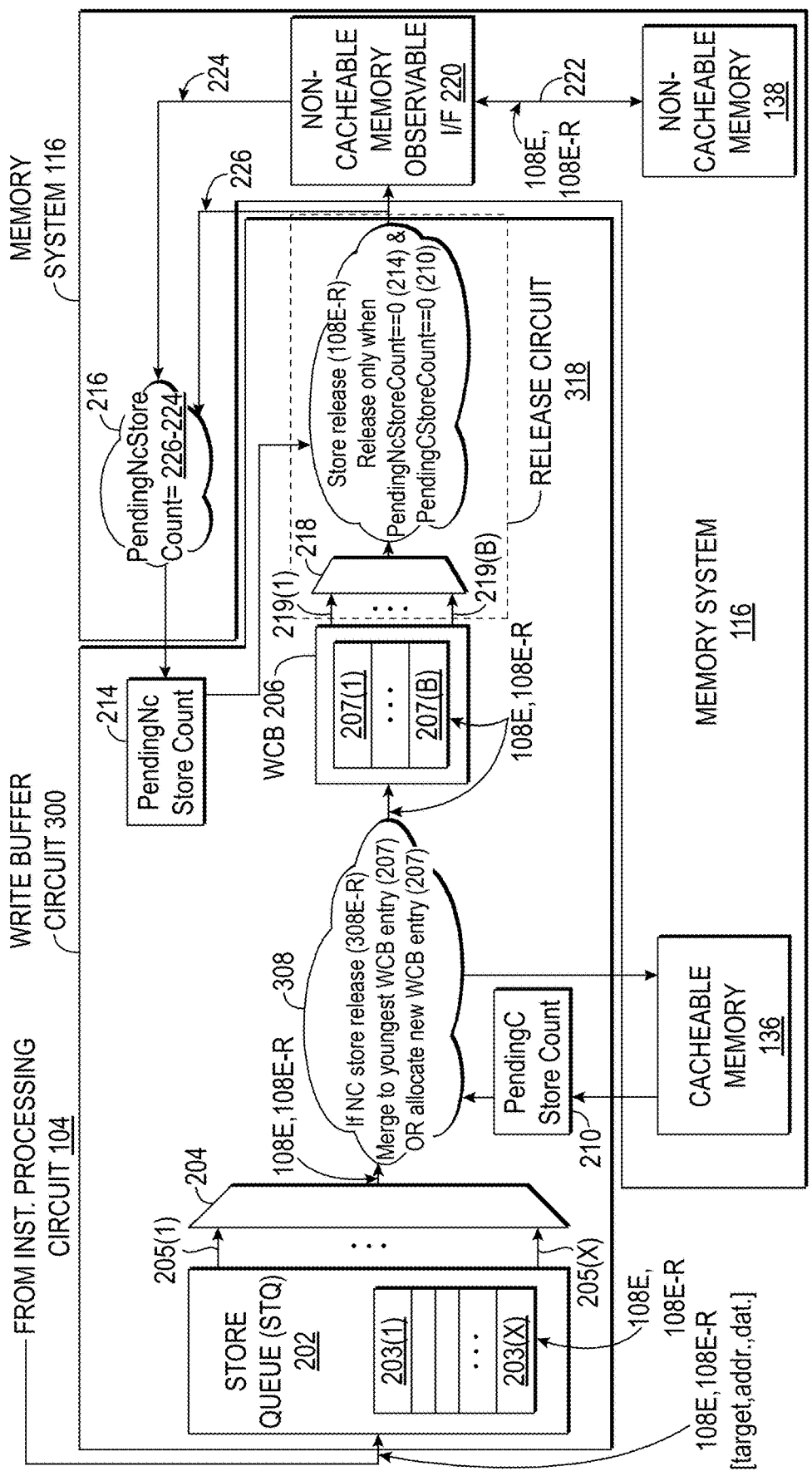
FIG. 3 is a block diagram of an exemplary write buffer circuit that can be interfaced to a memory access stage of an instruction processing circuit of the processor in FIG. 1, wherein the write buffer circuit is configured to allow store release instructions to be launched from the STQ to the WCB even if there are pending, older store instructions not yet committed to non-cacheable memory, but the write buffer circuit is configured to delay the release of store release instructions from the WCB for their write data to be committed to non-cacheable memory until any pending, older store instructions have been committed to memory.

Before discussing exemplary aspects of the write buffer circuit that can be provided in a processor-based system and that is configured to allow store release instructions to be launched from the STQ to the WCB even if there are pending, older store instructions not yet committed to memory starting at FIG. 3, an exemplary processor-based system with an instruction processing circuit interfaced with a write buffer circuit that does not allow store release instructions to be launched from the STQ when there are pending, older store instructions is first described with regard to FIGS. 1 and 2 below.

In this regard, FIG. 1 is a block diagram of an exemplary processor-based system 100 that includes a processor 102. For example, the processor 102 as well as the processor-based system 100 could be included in system-on-a-chip (SoC) 106. The processor 102 includes an instruction processing circuit 104 that includes one or more instruction pipelines $I_0$-$I_N$ configured to fetch, decode, and execute instructions 108 to perform tasks according to the processed instruction. The instructions 108 are fetched by an instruction fetch circuit 110 provided in a front end instruction circuit 112 of the instruction processing circuit 104 from an instruction memory 114. The instruction memory 114 may be provided in or as part of a memory system 116 in the processor-based system 100 as an example. The instruction fetch circuit 110 is configured to provide the fetched instructions 108 into the one or more instruction pipelines $I_0$-$I_N$ in the instruction processing circuit 104 to be pre-processed before the fetched instructions 108 reach an execution circuit 118 in a back end instruction circuit 120 in the instruction processing circuit 104 to be executed. As will next be discussed, the instruction pipelines $I_0$-$I_N$ are provided across different processing circuits or stages of the instruction processing circuit 104 to pre-process and process the instructions 108 in a series of steps that are performed concurrently to increase throughput prior to execution of the instructions 108 in the execution circuit 118.

With continuing reference to FIG. 1, the front end instruction circuit 112 of the instruction processing circuit 104 in this example includes an instruction decode circuit 122. The instruction decode circuit 122 is configured to decode the fetched instructions 108 fetched by the instruction fetch circuit 110 to determine the type of instruction and actions required to provide decoded instructions 108D, and, in turn is used to determine in which instruction pipeline $I_0$-$I_N$ the decoded instructions 108D should be placed. A control flow prediction circuit 124 is also provided in the front end instruction circuit 112 to speculate or predict a target address for a control flow instruction 108, such as a conditional branch instruction. The prediction of the target address by the control flow prediction circuit 124 is used by the instruction fetch circuit 110 to determine the next instructions 108 to fetch behind the control flow instruction 108 assuming the control flow instruction 108 will be resolved to jump to the predicted target address.

With continuing reference to FIG. 1, in this example, the decoded instructions 108D are then placed in one or more of the instruction pipelines $I_0$-$I_N$ and are next provided to a renaming circuit 126 in the back end instruction circuit 120 of the instruction processing circuit 104. The renaming circuit 126 is configured to determine if any register names in the decoded instructions 108D need to be renamed to break any register dependencies that would prevent parallel or out-of-order processing (OoP) of the instructions. The instruction processing circuit 104 in FIG. 1 is capable of processing instructions out-of-order, if possible, to achieve greater throughput performance and parallelism. However, the number of architectural registers provided in the processor 102 may be limited. In this regard, the renaming circuit 126 is configured to call upon a register map table (RMT) as is known, to rename the logical source and destination register names to available physical register names in a physical register file (PRF) as is known that typically provides more registers than architectural registers available. An allocate circuit 128 in a next step of the back end instruction circuit 120 reads the physical registers containing source operands from a PRF to determine if a producing instruction 108D responsible for producing the value to be consumed by a consuming instruction 108D has been executed. If the producing instruction 108D has not yet been executed, the value will be received by the producing instruction 108D via a live forwarding path. An issue circuit 130 (also known as a "dispatch circuit") can dispatch decoded instructions 108D out-of-order to execution units $Ex_0$-$Ex_N$ in the execution circuit 118 to be executed as executed instructions 108E after identifying and arbitrating among instructions 108D that have all their source operations ready. A commit circuit 132 (also known as a write-back circuit) is also provided in the back end instruction circuit 120 as a final stage configured to update the architectural and memory state of the processor 102 for the executed instructions 108E and to process exceptions caused by the executed instructions 108E. The commit circuit 132 can also be configured to write back produced data generated by the execution circuit 118 to an earlier stage in the instruction pipelines $I_0$-$I_N$ or could be external to the processor 102

As part of executing instructions 108D, the execution circuit 118 is configured to execute memory access instructions 108D (e.g., load and store instructions). The execution circuit 118 is configured to resolve the target address [target addr.] of a memory access instruction 108D that is the memory address of the location in memory where the data [dat.] to be operated on is stored. For a load instruction, the target address is the memory address in which the data to be read is stored. For a store instruction, the target address is the memory address in memory to which store data is to be written. The execution circuit 118 (or a memory access circuit coupled or associated therewith) can be part of a memory access stage of the instruction processing circuit 104, and is configured to communicate executed store instructions 108E to a write buffer circuit 134 to be written to the memory system 116 in the processor-based system 100. The memory system 116 includes cacheable memory 136 (e.g., private level 1 (L1) cache memory, shared level 2 (L2) cache memory) in the processor 102 that can be accessed for local cache storage. The memory system 116 also includes non-cacheable memory 138 (e.g., a last level cache (LLC) memory 140 and system memory 142 (e.g., dynamic random access memory (DRAM)) outside of the processor 102 and in the processor-based system 100. The write buffer circuit 134 provides an interface between the instruction processing circuit 104 and the memory system 116 in order to carry out a write transaction for an executed store instruction 108E. The write buffer circuit 134 could be part of the processor 102, such as in the execution circuit 118 or the commit circuit 132 that is also configured to write back produced data generated by the execution circuit 118 to an earlier stage in the instruction pipelines $I_0$-$I_N$ or could be external to the processor 102. The write buffer circuit 134 could be part of a memory controller 144 that is configured to carry out requested memory transactions to the non-cacheable memory 138 of the memory system 116.

FIG. 2 is a block diagram of an exemplary write buffer circuit 200 that could be provided as the write buffer circuit 134 in the processor-based system 100 in FIG. 1. In this regard, the exemplary write buffer circuit 200 will be discussed in reference to the processor-based system 100 in FIG. 1. The write buffer circuit 200 includes a store queue (STQ) 202 that that includes a plurality of instruction buffer entries 203(1)-203(X) each configured to queue a store instruction 108E (e.g., a target address and the data to be written) communicated from the instruction processing circuit 104 in an order to be processed for their data to be written to the memory system 116. A queued store instruction 108E may be processed for its data to be written to the cacheable memory 136 or the non-cacheable memory 138. If data from a store instruction 108E is to be written to the cacheable memory 136, and the memory address of the data to be written is in an exclusive cache state, the store instruction 108E is launched from the STQ 202 by a launch circuit 204 into the cacheable memory 136 for its data to be written to the cacheable memory 136. For example, the launch circuit 204 may be a multiplexer circuit that is configured to couple one of a plurality of output ports 205(1)-205(X), to communicate a respective store instruction 108E, 108E-R in the respective instruction buffer entry 203(1)-203(X) in the STQ 202, to a launch control circuit 208. The STQ 202 is configured to store the store instructions 108E, 108E-R in order from oldest to youngest, such that the launch circuit 204 is configured to launch a next store instruction 108E, 108E-R as the oldest store instruction 108E, 108E-R from the STQ 202. The STQ 202 can be configured to control the launch circuit 204 to select the next oldest store instruction 108E, 108E-R to launch from the STQ 202. However, if the data from a store instruction 108E is to be written to the non-cacheable memory 138, the store instruction 108E is launched by the launch circuit 204 into a write combining buffer (WCB) 206 for possible combining with other store instructions 108E that have a target address to the same block of memory of a resolution that can be written in a single write transaction (a cache line or a memory burst) to the non-cacheable memory 138 for efficiency purposes.

In this example, the WCB 206 includes a plurality of combining buffer entries 207(1)-207(B) to store non-combined and/or combined store instructions 108E, 108E-R in order from oldest received to youngest received to then be able to provide such store instructions 108E, 108E-R for their data to be written into the non-cacheable memory 138. In this manner, such combined store instructions 108E can be released for their data to be written into the non-cacheable memory 138 in a single write operation for increased efficiency. Both store instructions 108E that are combined in the WCB 206 and store instructions 108E that are not combinable in the WCB 206 are processed in order by the write buffer circuit 200 for their write data to be written to the non-cacheable memory 138.

With continuing reference to FIG. 2, a write operation for a store instruction 108E processed by the write buffer circuit 200 to write data to the non-cacheable memory 138 is slower than a write operation for a store instruction 108E to write data to the cacheable memory 136. Thus, a read hazard can occur if another processor or CPU reads data at a memory address in the same memory address in the memory system 116 as the target address of a pending store instruction 108E whose data has not yet been written to the memory system 116 in an observable (i.e., readable) manner. To solve this issue, an instruction set architecture (ISA) for the processor 102 in FIG. 1 can be designed to support a "store with release" ("store release") instruction 108R. A store release instruction is an instruction calling for data to be written to the memory system 116 only after all other pending, older store instructions 108E to the cacheable and non-cacheable memories 136, 138 have been committed (i.e., completed) with their written data observable (i.e., readable). Thus, a store release instruction 108R that has been executed as a store release instruction 108E-R has semantics that can be recognized by the write buffer circuit 200 in FIG. 2 to enforce that processing of all pending, older store instructions 108E is completed (i.e., their data written to memory being observable) before a new executed store release instruction 108E-R is processed and its data written to the non-cacheable memory 138. For example, a programmer may specifically use a store release instruction in program code in combination with load-acquire instructions to protect critical sections of program code to ensure that accesses made within the critical code section are not reordered outside of the critical section. For example, sometimes when program code of a first ISA (e.g., x86 ISA) is converted into a new, different ISA (e.g., ARM ISA), all store instructions may be automatically converted into store release instructions to ensure order compatibility when the program code is executed in the new ISA. This is because a programmer in a first ISA may have assumed that certain store instructions would be processed in a certain order based on its architecture, but this assumption may not be necessarily true in a new ISA. Thus, the conversion of the program code to the new ISA may convert all or a large number of store instructions in the program code to store release instructions to ensure order compatibility.

The instruction processing circuit 104 in FIG. 1 supporting store release instructions 108R can reduce store instruction throughput performance in the instruction processing circuit 104. The launch circuit 204 in the write buffer circuit 200 in FIG. 2 includes the launch control circuit 208 that is configured to not launch an executed store release instruction 108E-R from the STQ 202 to the WCB 206 to write its data to the non-cacheable memory 138 until all pending, older store instructions 108E have been committed in the memory system 116 and their written data observable. In this example, the launch control circuit 208 is configured to receive a pending cacheable store count 210 from a cacheable pending store counter 212 that indicates a number of pending store instructions to be written to the cacheable memory 136. For example, the cacheable pending store counter 212 could be a register that is configured to store a binary number as the cacheable pending store counter 212 of a length sufficient to maintain a desired pending cacheable store count 210 with or without rollover. The cacheable memory 136 (e.g., its cache controller) is configured to update the pending cacheable store count 210 in the cacheable pending store counter 212 by increasing the pending cacheable store count 210 for each received store instruction 108E received for its data to be written into the cacheable memory 136 and decreasing the pending cacheable store count 210 for each completed write operation for the received store instruction 108E such that the written data is observable, such as being in a modified cache state. The launch control circuit 208 is also configured to receive a pending non-cacheable store count 214 from a non-cacheable pending store counter 216 that indicates a number of pending store instructions 108E, 108E-R to be written to the non-cacheable memory 138. For example, the non-cacheable pending store counter 216 could be a register that is configured to store a binary number as the non-cacheable pending store counter 216 of a length sufficient to maintain a desired pending non-cacheable store count 214 with or without rollover. The non-cacheable memory 138 (e.g., its memory controller 144 (see FIG. 1)) is configured to update the pending non-cacheable store count 214 in the non-cacheable pending store counter 216 by increasing the pending non-cacheable store count 214 for each received store instruction 108E (whether it is a store release or non-release store instruction) released to the non-cacheable memory interface 220 for its data to be written into the non-cacheable memory 138. The non-cacheable memory 138 (e.g., its memory controller 144 (see FIG. 1)) is also configured to update the pending non-cacheable store count 214 by decreasing the pending non-cacheable store count 214 for each completed write operation for the received store instructions 108E (whether it is a store release or non-release store instruction) such that the written data is observable.

In this example, a release circuit 218 is coupled to the WCB 206 and is configured to release a next store instruction 108E, 108E-R as the oldest store instruction(s) 108E, 108E-R in the WCB 206 for its data to be stored into the non-cacheable memory 138. For example, the release circuit 218 could be a multiplexer circuit that is configured to couple one of a plurality of output ports 219(1)-219(B) each coupled to a combining buffer entry 207(1)-207(B) in the WCB 206 configured to store a store instruction 108E, 108E-R, to communicate the respective store instruction 108E, 108E-R in the respective combining buffer entry 207(1)-207(B) to a non-cacheable observable memory interface 220. If the next store instruction 108E, 108E-R has been combined with a younger store instruction 108E, 108E-R, then the combined store instructions 108E, 108E-R can be released with its combined store instruction 108E, 108E-R when the next oldest store instruction 108E, 108E-R is in the WCB 206. In this example, the release circuit 218 provides the store instruction(s) 108E, 108E-R to the non-cacheable observable memory interface 220 (e.g., a memory system interface, such as a CHI interface) to be provided on a memory bus 222 to be written to the non-cacheable memory 138. The non-cacheable observable memory interface 220 is configured to communicate a store operation acknowledgement 224 to the non-cacheable store counter 216 to cause the pending non-cacheable store count 214 to be decreased in count in response to a write operation for a store instruction 108E, 108E-R being completed and observable. The release circuit 218 is configured to communicate a pending store indicator 226 to the non-cacheable pending store counter 216 to cause the pending non-cacheable store count 214 to be increased in count in response to a released store instruction 108E, 108E-R from the WCB 206 to be written.

Thus, in this scenario, the WCB 206 will be empty when all the pending, older store instructions 108E have been committed to the memory system 116 before a next, store release instruction 108E-R scheduled to be launched from the STQ 202, can be launched into the WCB 206 to be processed. A next, store release instruction 108E-R would have to be first launched into the WCB 206 before it could be processed and its data written to the non-cacheable memory 138, thus adding a pipeline bubble in the WCB 206 in the write buffer circuit 200. In this example, the WCB 206 is configured to provide a store combining buffer entry indicator 228 to the launch control circuit 208 indicating whether the WCB 206 includes any pending store instructions 108E, 108E-R, so that the launch control circuit 208 also will not launch a next store release instruction 108E into the WCB 206 unless the combining buffer entries 207(1)-207(B) are empty. This is so a next store release instruction 108E-R will be guaranteed to be the oldest store instruction 108E in the WCB 206 to avoid a read hazard. The write buffer circuit 200 not being able to go ahead and "pipeline" the launch of the next store release instruction 108E-R from the STQ 202 to the WCB 206 while there are pending, older store instructions 108E not yet committed can also cause the STQ 202 to become full with queued store instructions 108E faster, thus creating a pipeline bubble in the instruction processing circuit 104. These throughput inefficiencies are exacerbated when a large number of store release instructions 108R are used in program code, such as when an ISA is converted into a different ISA that converts all store instructions to store release instructions.

As discussed in more detail below, to avoid the need for the write buffer circuit 200 in FIG. 2 to delay launching a store release instruction 108E-R queued in the STQ 202 to the WCB 206 until all pending, older store instructions 108 have been committed, the write buffer circuit 200 is configured to allow store release instructions 108R to be launched from the STQ 202 to the WCB 206 even if there are pending, older store instructions 108 not yet committed with their written data observable from the memory system 116. To accomplish this, the write buffer circuit 200 is configured to delay the release of store release instructions 108R from the WCB 206 for their write data to be written to the non-cacheable memory 138 until any pending, older store instructions 108 have been committed in the memory system 116 (i.e., pending store instruction with data to be written to both the cacheable and non-cacheable memories 136, 138 are observable). This can avoid a pipeline bubble in the write buffer circuit 200, and in the instruction processing circuit 104 in the processor 102 in FIG. 1 by the WCB 206 being empty and having to be filled with a next store release instruction 108R first before the store release instruction 108R can be processed. The next store release instruction 108R can already be present in the WCB 206 when the last of any pending, older store instructions 108 are committed for the next store release instruction 108R to then be processed to have its data written to the non-cacheable memory 138. This avoids a pipeline bubble in the write buffer circuit 200 that would otherwise result from the WCB 206 being forced to be empty when the next store release instruction 108R in the STQ 202 is to be processed.

In exemplary aspects, to avoid the need for a write buffer circuit, such as the write buffer circuit 200 in FIG. 2, to delay launching a store release instruction queued in a STQ to a WCB until all pending, older store instructions have been committed, another exemplary write buffer circuit 300 in provided in FIG. 3. The write buffer circuit 300 in FIG. 3 can also be provided as the write buffer circuit 134 in the processor-based system 100 in FIG. 1. In this regard, the exemplary write buffer circuit 300 will be discussed in reference to the processor-based system 100 in FIG. 1. Common components between the write buffer circuit 300 in FIG. 3 and the write buffer circuit 200 in FIG. 2 are shown with common element numbers and may not be re-described below.

In this regard, the write buffer circuit 300 in FIG. 3 includes a launch control circuit 308 that is configured to allow store release instructions 108E-R to be launched from the STQ 202 to the WCB 206 regardless of whether there are pending, older store instructions 108E, 108E-R not yet committed to the memory system 116 with their written data observable. To accomplish this, as discussed in more detail below, the write buffer circuit 300 is configured to delay the release of store release instructions 108E-R from the WCB 206 for their write data to be written to the non-cacheable memory 138 until any pending, older store instructions 108E, 108E-R directed to the cacheable memory 136 and the non-cacheable memory 138 have both been fully committed (i.e., their data written to both the cacheable memory 136 and the non-cacheable memory 138 is observable). In this regard, as shown in FIG. 3, the write buffer circuit 300 includes another exemplary release circuit 318 that controls the release of store release instructions 108E-R from the WCB 206. For example, the release circuit 318 could be a multiplexer circuit that is configured to couple one of the plurality of output ports 219(1)-219(B) each coupled to a combining buffer entry 207(1)-207(B) in the WCB 206 configured to store a store instruction 108E, 108E-R, to communicate the respective store instruction 108E, 108E-R in the respective combining buffer entry 207(1)-207(B) to the non-cacheable observable memory interface 220. The release circuit 318 is configured to only cause a next store release instruction 108E-R as the oldest store instruction 108E stored in the WCB 206 to be released (as discussed in more detail below), if there are no pending store instructions 108E, 108E-R for their data to be written to both the cacheable memory 136 and the non-cacheable memory 138.

In this regard, as shown in FIG. 3, the release circuit 318 is configured to receive both the pending cacheable store count 210 from the cacheable pending store counter 212 and the pending non-cacheable store count 214 from the non-cacheable pending store counter 216, that are updated like previously described in the write buffer circuit 200 in FIG. 2. Only if both the pending cacheable store count 210 and the pending non-cacheable store count 214 indicate no pending store instructions 108E, 108E-R to be written (e.g., their count values are zero (0)) does the release circuit 318 release a store release instruction 108E-R from the WCB 206 to have its data written to the non-cacheable memory 138. If either the pending cacheable store count 210 or the pending non-cacheable store count 214 indicate any pending store instructions 108E, 108E-R, the release circuit 318 is configured to not release the next store release instruction 108E-R from the WCB 206 to be processed. The release circuit 318 will release a next non-release store instruction 108E from the WCB 206 to be processed regardless of whether there are pending store instructions 108E, 108E-R with their data yet to be written.

In this regard, the release circuit 318 being configured to control the release of a next store release instruction 108E-R from the WCB 206, as opposed to the launch control circuit 208 in the write buffer circuit 200 in FIG. 2 not allowing a next store release instruction 108E-R to be launched from the STQ 202 to the WCB 206 unless there are no pending store instructions 108E, 108E-R, can avoid a pipeline bubble in the write buffer circuit 300. A next store release instruction 108E-R can already be present in the WCB 206 when the last of any pending, older store instructions 108E, 108E-R are committed for the next store release instruction 108E-R already queued up in the WCB 206 to then be released to be processed to have its data written to the non-cacheable memory 138. This avoids a pipeline bubble in the write buffer circuit 300 that would otherwise result from the WCB 206 being forced to be empty when a next store release instruction in the STQ 202 is to be launched. This can also release storage pressure on the STQ 202 in the write buffer circuit 300, because the STQ 202 may not have to be designed of a larger size to be capable of storing a larger number of store instructions 108E, 108E-R that must account for store release instructions 108E-R that would not be launchable into the WCB 206 until any pending, older store instructions 108E, 108E-R have been committed. In other words, the array size of the STQ 202 and the WCB 206 can be sized based on a cooperate ability of the WCB 206 to utilize both the STQ 202 and the WCB 206 for queuing store release instructions 108E-R to be combined and released, because the STQ 202 and the WCB 206 can both be utilized for store release instructions 108E-R even with the presence of pending, older store instructions 108E, 108E-R to be written to the memory system 116.

Figure 4:
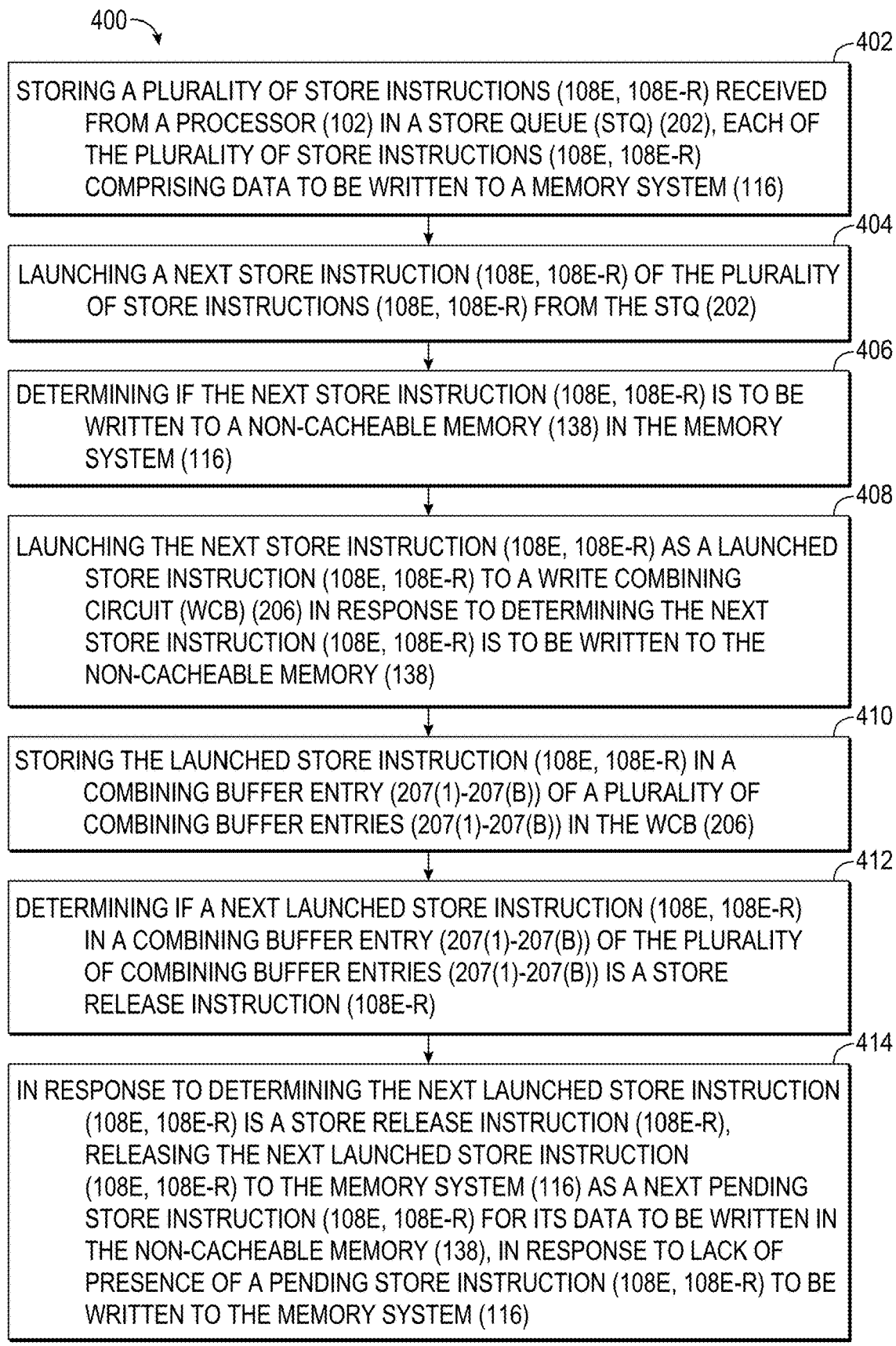
FIG. 4 is a flowchart illustrating an exemplary process of the write buffer circuit in FIG. 3 launching store release instructions from the STQ to the WCB even if there are pending, older store instructions not yet committed to the memory system, and delaying the release of store release instructions from the WCB for their write data be committed to non-cacheable memory until any pending, older store instructions have been committed to memory.

FIG. 4 is a flowchart illustrating an exemplary process 400 of the write buffer circuit 300 in FIG. 3 launching store release instructions from a STQ to a WCB even if there are pending, older store instructions not yet committed to a memory system, but delaying the release of store release instructions from the WCB 206 for their write data be committed to a non-cacheable memory in a memory system until any pending, older store instructions have been committed to the memory system. The process 400 in FIG. 4 is described with reference to the exemplary write buffer circuit 300 in FIG. 3, but such is not limiting.

In this regard, a first step in the process 400 can be storing a plurality of store instructions 108E, 108E-R received from a processor 102 in the STQ 202, each of the plurality of store instructions 108E, 108E-R comprising data to be written to a memory system 116 (block 402 in FIG. 4). A next step in the process 400 can be launching a next store instruction 108E, 108E-R of the plurality of store instructions 108E, 108E-R from the STQ 202 (block 404 in FIG. 4). A next step in the process 400 can be determining if the next store instruction 108E, 108E-R is to be written to a non-cacheable memory 138 in the memory system 116 (block 406 in FIG. 4). A next step in the process 400 can be launching the next store instruction 108E, 108E-R as a launched store instruction 108E, 108E-R to the WCB 206 in response to determining the next store instruction 108E, 108E-R is to be written to the non-cacheable memory 138 (block 408 in FIG. 4). A next step in the process 400 can be storing the launched store instruction 108E, 108E-R in a buffer entry 207(1)-207(B) of a plurality of combining buffer entries 207(1)-207(B) in the WCB 206 (block 410 in FIG. 4). A next step in the process 400 can be determining if a next launched store instruction 108E, 108E-R in a combining buffer entry 207(1)-207(B) of the plurality of combining buffer entries 207(1)-207(B) is a store release instruction 108E-R (block 412 in FIG. 4). A next step in the process 400 can be, in response to determining the next launched store instruction 108E, 108E-R is a store release instruction 108E-R, releasing the next launched store instruction 108E, 108E-R to the memory system 116 as a next pending store instruction 108E, 108E-R for its data to be written in the non-cacheable memory 138, in response to lack of presence of a pending store instruction 108E, 108E-R to be written to the memory system 116 (block 414 in FIG. 4).

The release circuit 318 of the write buffer circuit 300 in FIG. 3 is configured to release the oldest store instruction 108E, 108E-R in the WCB 206 for its data to be written to the non-cacheable memory 138. If the oldest store instruction 108E, 108E-R in the WCB 206 is a store release instruction 108E-R, as discussed above, the release circuit 318 will not release the store release instruction 108E-R as the oldest store instruction 108E to be released for its data to be written to the non-cacheable memory 138 until any pending, older store instructions 108E, 108E-R being written to both cacheable and non-cacheable memory 136, 138 have been committed with its written data observable. If the oldest store instruction 108E in the WCB 206 is a not store release instruction 108E-R, the release circuit 318 is configured to release such store instruction 108E for its data to be written to the non-cacheable memory 138 regardless of whether there are pending, older store instructions 108E whose data has not yet been written to either cacheable or non-cacheable memory 136, 138.

Further, another benefit of the launch control circuit 308 in the write buffer circuit 300 in FIG. 3 being configured to allow store release instructions 108E-R to be launched from the STQ 202 to the WCB 206 even if there are pending, older store instructions 108E, 108E-R not yet committed, is that this allows combining of multiple store-release instructions 108E-R in the WCB 206. That is, multiple store-release instructions 108E-R that are launched into the WCB 206 and target addresses [target addr.] to the same memory block of a resolution that can be written in a single write operation to the non-cacheable memory 138 can be combined to write their data [dat.] to the non-cacheable memory 138 as a single write operation. In this manner, like non-release store instructions 108E that do not include release semantics that are eligible to be combined in the WCB 206, store release instructions 108E-R are also eligible to be combined in the WCB 206 for greater efficiency in processing store release instructions 108E-R from the WCB 206. Once any pending, older store instructions 108E, 108E-R have been committed, a next store release instruction 108E-R (or next combined store release instructions 108E-R) can be released from the WCB 206 buffer to be processed for their data [dat.] to be written to the non-cacheable memory 138 without additional delay in having to first launch the next store release instruction 108E-R from the STQ 202 to the WCB 206.

For example, if the target address [target addr.] of an existing store release instruction 108E-R stored in a combining buffer entry 207(1)-207(B) of the WCB 206 is in the same cache line (e.g., 64 byte (B) cache line) as a next store release instruction 108E-R to be launched from the STQ 202, the WCB 206 is configured to combine the next store release instruction 108E-R with the existing store release instruction 108E-R in the combining buffer entry 207(1)-207(B) in the WCB 206 currently storing the existing store release instruction 108ER. Then, when the combined store release instructions 108E-R in the WCB 206 are the oldest store instructions 108E in the WCB 206, the release circuit 318 is configured to release the combined store release instructions 108E-R from the WCB 206 to the non-cacheable observable memory interface 220 to prepare the data [dat.] of the combined store release instructions 108E-R to be written to the non-cacheable memory 138.

In another exemplary aspect, the launch control circuit 308 of the write buffer circuit 300 in FIG. 3 is configured to allow combining a next store release instruction 108E-R launched from the STQ 202 with an existing older store release instruction 108E-R in the WCB 206 that has a target address to the same memory block writable with a single write operation, if the existing older store release instruction 108E-R is the youngest store instruction 108E in the WCB 206. Otherwise, the launch control circuit 308 allocates a new combining buffer entry 207(1)-207(B) in the WCB 206 to the next store release instruction 108E-R to be the youngest store instruction 108E stored in the WCB 206. In this manner, the next store release instructions 108E-R launched from the STQ 202 to the WCB 206 remains in order behind other existing, older store instructions 108E, 108E-R in the WCB 206 for the WCB 206 to maintain the ordering of store instructions 108E, 108E-R to be processed to have their data written to the memory system 116. This is because it may be required for all existing, older store instructions 108E, 108E-R in the WCB 206 to be committed before the younger, next store release instructions 108E, 108E-R are processed to enforce the release requirements of the younger, next store release instruction 108E, 108E-R. However, if the next store release instructions 108E-R launched from the STQ 202 to the WCB 206 can be combined with the youngest stored instruction 108E in the WCB 206 as a combinable store release instruction 108E-R, then ordering of the store instructions 108E, 108E-R is maintained even with the combining of store release instructions 108E-R.

In another exemplary aspect, when a next store release instruction 108E-R is launched from the STQ 202 to the WCB 206 in the write buffer circuit 300 in FIG. 3, the launch control circuit 308 can be configured to enforce that all combining buffer entries 207(1)-207(B) in the WCB 206 are closed except the combining buffer entry 207(1)-207(B) that has a store release instruction 108E-R being combined with the next launched store instruction 108E, 108E-R. In this manner, the next launched release instruction 108E-R cannot be launched from the STQ 202 to the WCB 206 until such next launched store release instruction 108E-R is combined with an existing combining buffer entry 207(1)-207(B) or placed into a new allocated combining buffer entry 207(1)-207(B) in the WCB 206. This is so that the order of the store release instructions 108E-R in the WCB 206 is maintained. The combining buffer entries 207(1)-207(B) in the WCB 206 can be reopened by the launch control circuit 308 once the next launched release instruction 108E-R is combined with an existing combining buffer entry 207(1)-207(B) or placed into a new allocated combining buffer entry 207(1)-207(B) in the WCB 206.

A write buffer circuit, including, but not limited to, the write buffer circuit in FIG. 3, that is interfaced to an instruction processing circuit of a processor in the processor-based circuit, and configured to allow store release instructions to be launched from a STQ to a WCB even if there are pending, older store instructions not yet committed to memory, but the write buffer circuit is configured to delay the release of store release instructions from the WCB for their write data to be committed to non-cacheable memory until any pending, older store instructions have been committed to memory, and according to, but not limited to, the exemplary process in FIG. 4, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 5:
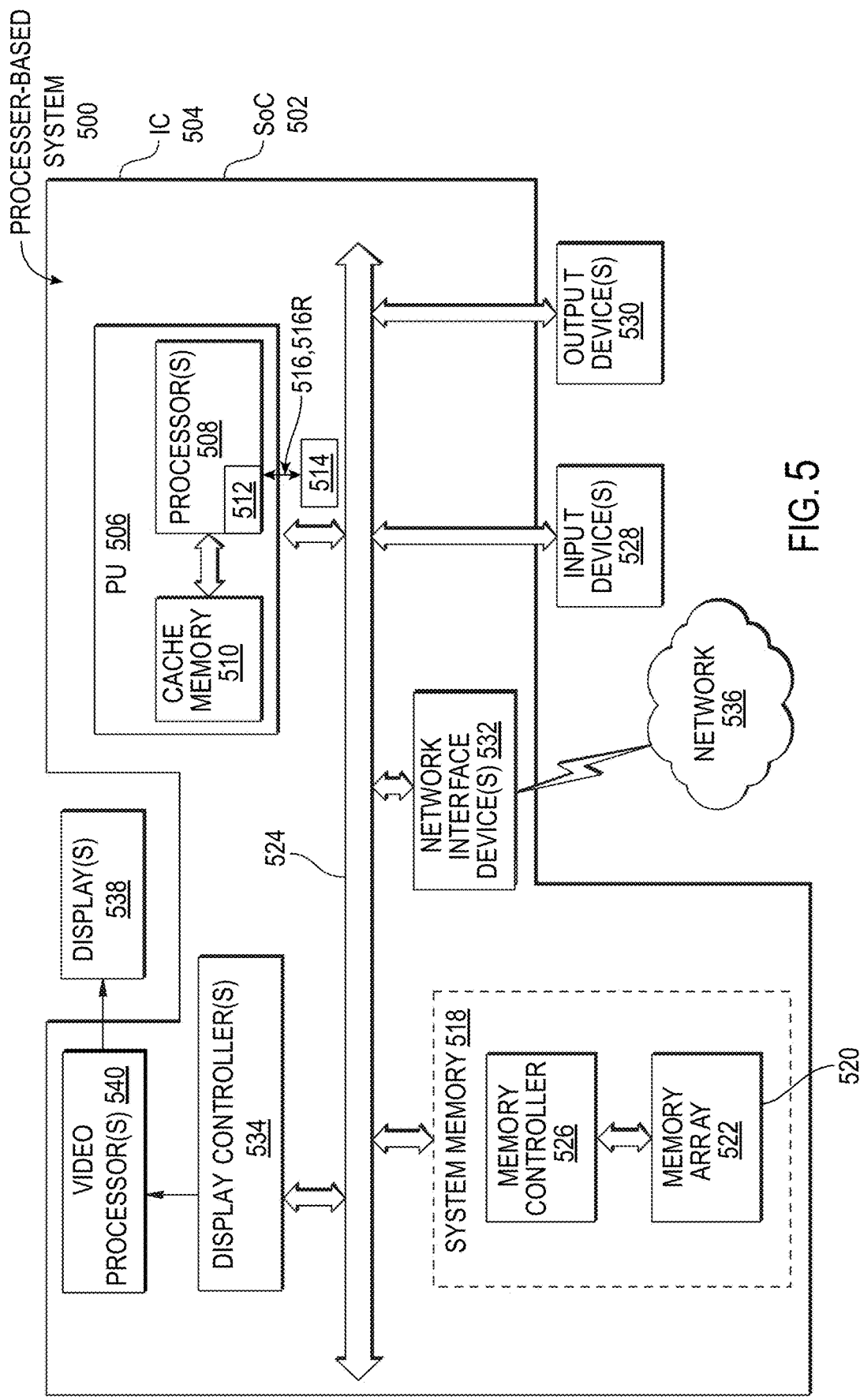
FIG. 5 is a block diagram of an exemplary processor-based system that includes a processor and a write buffer circuit, including, but not limited to, the write buffer circuit in FIG. 3, interfaced to an instruction processing circuit of a processor in the processor-based system, and configured to allow store release instructions to be launched from a STQ to a WCB even if there are pending, older store instructions not yet committed to memory, but the write buffer circuit is configured to delay the release of store release instructions from the WCB for their write data to be committed to non-cacheable memory until any pending, older store instructions have been committed to memory, and according to, but not limited to, the exemplary process in FIG. 4.

In this regard, FIG. 5 illustrates an example of a processor-based system 500 included in a SoC 502 that may be part of an IC 504. The processor-based system 500 may include or be provided in any of the above-referenced devices, as examples. The processor-based system 500 includes a processing unit (PU) 506 that includes one or more processors 508, which can include a central processing unit (CPU), graphics processing unit (GPU), and neural processing unit (NPU). The PU 506 may have a shared cache memory 510 coupled to the PU 506 for rapid access to temporarily stored data. The PU 506 includes an instruction processing circuit 512 that is interfaced to a write buffer circuit 514, which may be the write buffer circuit 300 in FIG. 3 and configured to perform the process 400 in FIG. 4, as examples. The write buffer circuit 514 may be a part of the instruction processing circuit 512 or the PU 506 or outside of the PU 506. The write buffer circuit 514 is configured to receive store instructions 516, including store release instructions 516R, from the instruction processing circuit 512 to be processed for their data to be written to a memory system, which can include the cache memory 510 and a system memory 518 that includes non-cacheable memory 520 as part of a memory array 522. The write buffer circuit 514 is configured to allow store release instructions 516R to be launched from a STQ to a WCB even if there are pending, older store instructions 516 not yet committed to the cache memory 510 and the non-cacheable memory 520, but the write buffer circuit 514 is configured to delay the release of store release instructions 516R from the WCB for their write data to be committed to the non-cacheable memory 520 until any pending, older store instructions 516R have been committed to the cache memory 510 and the non-cacheable memory 520.

The processor(s) 508 is coupled to a system bus 524 and can intercouple master and slave devices included in the processor-based system 500. As is well known, the processor(s) 508 communicates with these other devices by exchanging address, control, and data information over the system bus 524. For example, the processor(s) 508 can communicate bus transaction requests to a memory controller 526 of the system memory 518, as an example of a slave device. Although not illustrated in FIG. 5, multiple system buses 524 could be provided, wherein each system bus 524 constitutes a different fabric. Other master and slave devices can be connected to the system bus 524. As illustrated in FIG. 5, these devices can include the system memory 518 that includes the memory controller 526 and a memory array(s) 522.

With continuing reference to FIG. 5, the processor-based system 500 also includes one or more input devices 528, one or more output devices 530, one or more network interface devices 532, and one or more display controllers 534 as examples. The input device(s) 528 can include any type of input device, including, but not limited to, input keys, switches, voice processors, etc. The output device(s) 530 can include any type of output device, including, but not limited to, audio, video, other visual indicators, etc. The network interface device(s) 532 can be any device configured to allow exchange of data to and from a network 536. The network 536 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 532 can be configured to support any type of communications protocol desired.

The processor(s) 508 may also be configured to access the display controller(s) 534 over the system bus 524 to control information sent to one or more displays 538. The display controller(s) 534 sends information to the display(s) 538 to be displayed via one or more video processors 540, which process the information to be displayed into a format suitable for the display(s) 538. The display controller(s) 534 and video processor(s) 540 can be included in the same or different ICs, or in the same IC 504 containing the PU 506, as examples. The display(s) 538 can include any type of display, including, but not limited to, a cathode ray tube (CRT), a liquid crystal display (LCD), a plasma display, a light emitting diode (LED) display, etc.

Figure 6:
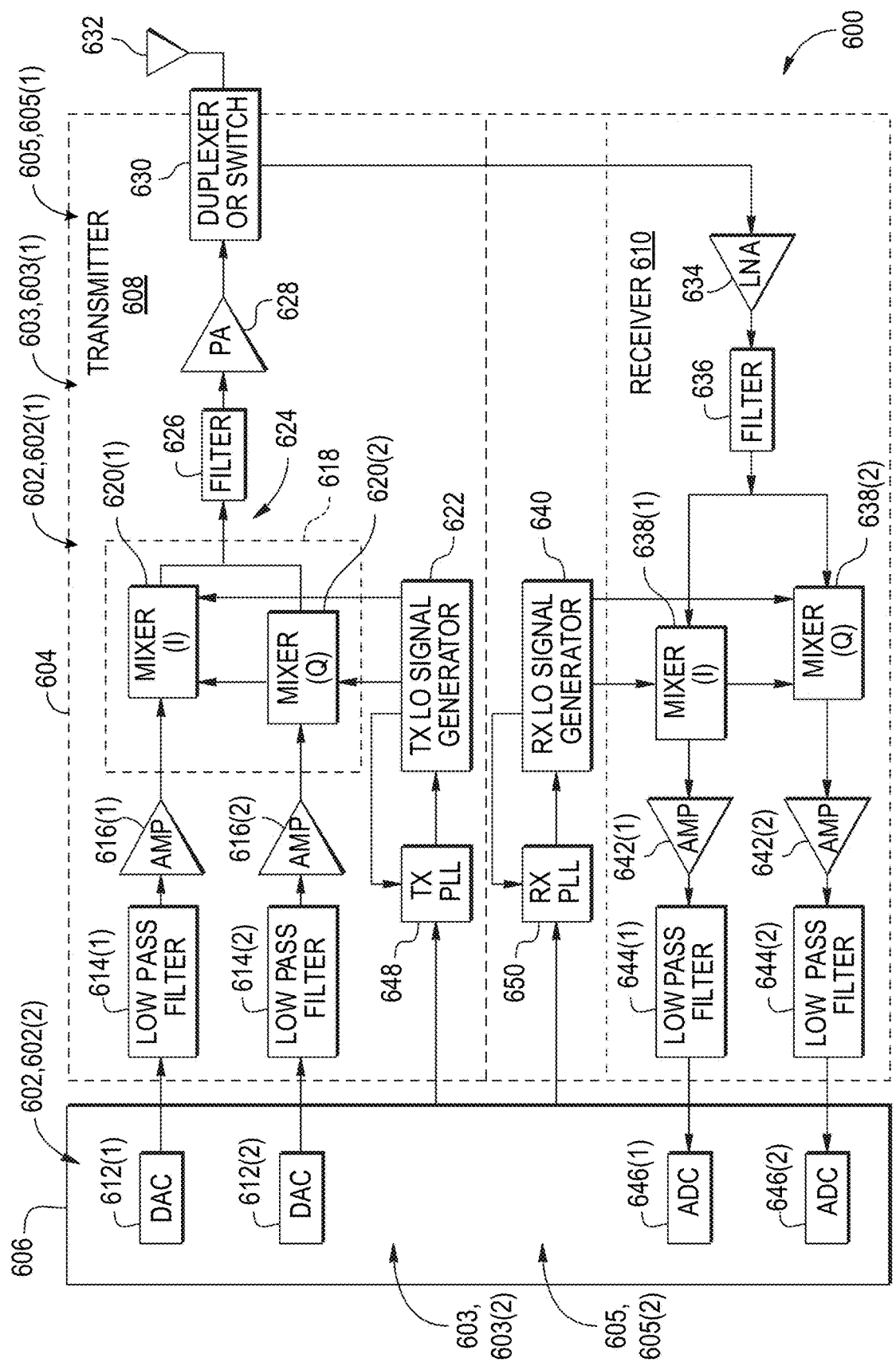
FIG. 6 is a block diagram of an exemplary wireless communications device that includes radio-frequency (RF) components, wherein any of the RF components can include a processor-based system that includes a processor and a write buffer circuit, including, but not limited to, the write buffer circuit in FIG. 3, interfaced to an instruction processing circuit of a processor in the processor-based system, and configured to allow store release instructions to be launched from a STQ to a WCB even if there are pending, older store instructions not yet committed to memory, but the write buffer circuit is configured to delay the release of store release instructions from the WCB for their write data to be committed to non-cacheable memory until any pending, older store instructions have been committed to memory, and according to, but not limited to, the exemplary process in FIG. 4.

FIG. 6 illustrates an exemplary wireless communications device 600 that includes radio frequency (RF) components and that can include a processor-based system 602, 602(1), 602(2) that each include a write buffer circuit 603, 603(1), 603(2), which may be the write buffer circuit 300 in FIG. 3 and configured to perform the process 400 in FIG. 4, as examples. The wireless communications device 600 may include or be provided in any of the above-referenced devices, as examples. The write buffer circuit 603, 603(1), 603(2), may be a part of the instruction processing circuit of a processor in the respective processor-based system 602, 602(1), 602(2) or outside of the processor. The write buffer circuit 603, 603(1), 603(2) is configured to receive store instructions 605, 605(1), 605(1), including store release instructions, from an instruction processing circuit to be processed for their data to be written to a memory system, which can include a cache memory and a non-cacheable memory as part of a memory array. The write buffer circuit 603, 603(1), 603(2) is configured to allow store release instructions 605, 605(1), 605(2) to be launched from a STQ to a WCB even if there are pending, older store instructions 605, 605(1), 605(2) not yet committed to memory, but the write buffer circuit 603, 603(1), 603(2) is configured to delay the release of store release instructions 605, 605(1), 605(2) from the WCB for their write data to be committed to the non-cacheable memory until any pending, older store instructions 605, 605(1), 605(2) have been committed to memory.

As shown in FIG. 6, the wireless communications device 600 includes a transceiver 604 and a data processor 606, each of which may include its processor-based system 602(1), 602(2). The transceiver 604 includes a transmitter 608 and a receiver 610 that support bi-directional communications. In general, the wireless communications device 600 may include any number of transmitters 608 and/or receivers 610 for any number of communication systems and frequency bands. All or a portion of the transceiver 604 may be implemented on one or more analog ICs, RF ICs (RFICs), mixed-signal ICs, etc.

The transmitter 608 or the receiver 610 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 610. In the direct-conversion architecture, a signal is frequency-converted between RF and baseband in one stage. The super-heterodyne and direct-conversion architectures may use different circuit blocks and/or have different requirements. In the wireless communications device 600 in FIG. 6, the transmitter 608 and the receiver 610 are implemented with the direct-conversion architecture.

In the transmit path, the data processor 606 processes data to be transmitted and provides I and Q analog output signals to the transmitter 608. In the exemplary wireless communications device 600, the data processor 606 includes digital-to-analog converters (DACs) 612(1), 612(2) for converting digital signals generated by the data processor 606 into the I and Q analog output signals, e.g., I and Q output currents, for further processing.

Within the transmitter 608, lowpass filters 614(1), 614(2) filter the I and Q analog output signals, respectively, to remove undesired signals caused by the prior digital-to-analog conversion. Amplifiers (AMPs) 616(1), 616(2) amplify the signals from the lowpass filters 614(1), 614(2), respectively, and provide I and Q baseband signals. An upconverter 618 upconverts the I and Q baseband signals with I and Q transmit (TX) local oscillator (LO) signals through mixers 620(1), 620(2) from a TX LO signal generator 622 to provide an upconverted signal 624. A filter 626 filters the upconverted signal 624 to remove undesired signals caused by the frequency up-conversion as well as noise in a receive frequency band. A power amplifier (PA) 628 amplifies the upconverted signal 624 from the filter 626 to obtain the desired output power level and provides a transmit RF signal. The transmit RF signal is routed through a duplexer or switch 630 and transmitted via an antenna 632.

In the receive path, the antenna 632 receives signals transmitted by base stations and provides a received RF signal, which is routed through the duplexer or switch 630 and provided to a low noise amplifier (LNA) 634. The duplexer or switch 630 is designed to operate with a specific receive (RX)-to-TX duplexer frequency separation, such that RX signals are isolated from TX signals. The received RF signal is amplified by the LNA 634 and filtered by a filter 636 to obtain a desired RF input signal. Down-conversion mixers 638(1), 638(2) mix the output of the filter 636 with I and Q RX LO signals (i.e., LO_I and LO_Q) from an RX LO signal generator 640 to generate I and Q baseband signals. The I and Q baseband signals are amplified by AMPs 642(1), 642(2) and further filtered by lowpass filters 644(1), 644(2) to obtain I and Q analog input signals, which are provided to the data processor 606. In this example, the data processor 606 includes analog-to-digital converters (ADCs) 646(1), 646(2) for converting the analog input signals into digital signals to be further processed by the data processor 606.

In the wireless communications device 600 of FIG. 6, the TX LO signal generator 622 generates the I and Q TX LO signals used for frequency up-conversion, while the RX LO signal generator 640 generates the I and Q RX LO signals used for frequency down-conversion. Each LO signal is a periodic signal with a particular fundamental frequency. A TX phase-locked loop (PLL) circuit 648 receives timing information from the data processor 606 and generates a control signal used to adjust the frequency and/or phase of the TX LO signals from the TX LO signal generator 622. Similarly, an RX PLL circuit 650 receives timing information from the data processor 606 and generates a control signal used to adjust the frequency and/or phase of the RX LO signals from the RX LO signal generator 640.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device or processing unit, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A write buffer circuit in a processor-based system, comprising:
    a store queue (STQ) configured to:
        store a plurality of store instructions received from a processor, each of the plurality of store instructions comprising data to be written to a memory system; and
    a write combining buffer (WCB) comprising a plurality of combining buffer entries;
    the write buffer circuit configured to:

launch a next store instruction of the plurality of store instructions from the STQ;
determine if the next store instruction is to be written to a non-cacheable memory in the memory system; and
in response to determining the next store instruction is to be written to the non-cacheable memory, launch the next store instruction as a launched store instruction to the WCB; and
the WCB configured to:
store the launched store instruction in a combining buffer entry of the plurality of combining buffer entries; and
the write buffer circuit further configured to:
determine if a next launched store instruction in a combining buffer entry of the plurality of combining buffer entries is a store release instruction; and
in response to determining the next launched store instruction is a store release instruction:
release the next launched store instruction in the WCB as a store release instruction to the memory system as a next pending store instruction for its data to be written to the non-cacheable memory, in response to lack of presence of a pending store instruction to be written to the memory system.

2. The write buffer circuit of clause 1, wherein the write buffer circuit is further configured to, in response to determining the next launched store instruction is a store release instruction, not release the next launched store instruction as a store release instruction in the WCB to the memory system as the next pending store instruction for its data to be written to the non-cacheable memory, in response to a presence of a pending store instruction to be written to the memory system.

3. The write buffer circuit of clause 1 or 2, configured to launch the next store instruction of the plurality of store instructions in the STQ as the launched store instruction to the WCB, regardless of the presence of a pending store instruction to be written to the memory system.

4. The write buffer circuit of any of clauses 1-3, wherein the WCB is configured to store the launched store instruction in the combining buffer entry of the plurality of combining buffer entries, by being configured to:
determine if the launched store instruction can be combined with an existing launched store instruction stored in a combining buffer entry of the plurality of combining buffer entries; and
in response to determining the launched store instruction can be combined with the existing launched store instruction:
cause the WCB to combine the launched store instruction with the existing launched store instruction into a combined launched store instruction in the combining buffer entry of the plurality of combining buffer entries, to store the launched store instruction in the combining buffer entry of the plurality of combining buffer entries.

5. The write buffer circuit of clause 4, wherein the WCB is configured to determine if the launched store instruction can be combined with the existing launched store instruction by being configured to:
determine if a target address of the launched store instruction and a target address of the existing launched store instruction are contained in a common memory block in the non-cacheable memory that can be written in a single write operation.

6. The write buffer circuit of clause 4 or 5, wherein the WCB is configured to:
determine if the next launched store instruction in a combining buffer entry of the plurality of combining buffer entries is a store release instruction by being configured to:
determine if a next combined launched store instruction in the combining buffer entry of the plurality of combining buffer entries is a combined launched store release instruction; and
in response to determining the next launched store instruction comprising the next combined launched store instruction is a store release instruction:
release the combined launched store instruction in the WCB to the memory system as the next pending combined store instruction for its data to be written to the non-cacheable memory, in response to lack of presence of a pending store instruction to be written to the memory system.

7. The write buffer circuit of clause 6 configured to determine if the launched store instruction can be combined with the existing launched store instruction by being configured to:
determine if the launched store instruction can be combined with the existing launched store instruction stored in the combining buffer entry of the plurality of combining buffer entries as a youngest launched store instruction in the WCB.

8. The write buffer circuit of any of clauses 4-7 further configured to, in response to determining the launched store instruction cannot be combined with the existing launched store instruction:
cause the WCB to store the launched store instruction in a new combining buffer entry of the plurality of combining buffer entries.

9. The write buffer circuit of any of clauses 1-8, further configured to:
determine if the launched store instruction is a store release instruction; and
in response to determining the launched store instruction is a store release instruction, the WCB further configured to:
close the other combining buffer entries of the plurality of combining buffer entries outside of the combining buffer entry in which the launched store instruction is stored.

10. The write buffer circuit of any of clauses 1-9 further configured to determine the presence of a pending store instruction to be written to the memory system.

11. The write buffer circuit of clause 10 configured to determine the presence of a pending store instruction to be written to the memory system by being configured to determine the presence of the pending store instruction to be written to the non-cacheable memory.

12. The write buffer circuit of clause 11 configured to:
determine the presence of the pending store instruction to be written to the non-cacheable memory, by being configured to determine if a non-cacheable pending store counter indicates the presence of a pending store instruction to be written to the non-cacheable memory.

13. The write buffer circuit of any of clauses 10-12 further configured to:
determine if the next store instruction is to be written to a cacheable memory in the memory system; and
in response to determining the next store instruction is to be written to the cacheable memory, launch the next store instruction as a second launched store instruction to the non-cacheable memory to be written to the non-cacheable memory.

14. The write buffer circuit of clause 13 configured to determine the presence of a pending store instruction to be written to the memory system by being configured to determine the presence of the pending store instruction to be written to the cacheable memory.

15. The write buffer circuit of clause 14 configured to:
determine the presence of the pending store instruction to be written to the memory system, by being configured to determine if a cacheable pending store counter indicates the presence of a pending store instruction to be written to the cacheable memory.

16. The write buffer circuit of clause 14 configured to determine the presence of the pending store instruction to be written to the memory system, by being configured to:
determine the presence of a pending store instruction to be written to the non-cacheable memory; and
determine the presence of a pending store instruction to be written to the cacheable memory.

17. The write buffer circuit of any of clauses 1-16, further configured to, in response to determining the next launched store instruction is not a store release instruction:
release the next launched store instruction in the WCB to the memory system as the next pending store instruction for its data to be written to the non-cacheable memory.

18. The write buffer circuit of any of clauses 1-17 configured to release the next launched store instruction to the memory system by being configured to release an oldest next launched store instruction in the WCB to the memory system.

19. The write buffer circuit of any of clauses 1-18, wherein:
the STQ is configured to store the plurality of store instructions received from the processor in order from an oldest received store instruction to a youngest received store instruction; and
the write buffer circuit is configured to launch the next store instruction of the plurality of store instructions in the STQ as the oldest received store instruction in the STQ.

20. The write buffer circuit of any of clauses 1-19, further comprising a release circuit coupled to the WCB, the release circuit configured to:
determine if the next launched store instruction in the combining buffer entry of the plurality of combining buffer entries is the store release instruction; and
in response to determining the next launched store instruction is the store release instruction:
release the next launched store instruction as the store release instruction in the WBC to the memory system as the next pending store instruction for its data to be written to the non-cacheable memory, in response to the lack of presence of a pending store instruction to be written to the memory system.

21. The write buffer circuit of any of clauses 1-20 integrated into a device, the device being one of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. A method of combining store release instructions to be written to memory in a processor-based system, comprising:
storing a plurality of store instructions received from an instruction processing circuit of a processor in a store queue (STQ), each of the plurality of store instructions comprising data to be written to a memory system;
launching a next store instruction of the plurality of store instructions from the STQ;
determining if the next store instruction is to be written to a non-cacheable memory in the memory system;
launching the next store instruction as a launched store instruction to a write combining buffer (WCB) in response to determining the next store instruction is to be written to the non-cacheable memory;
storing the launched store instruction in a combining buffer entry of a plurality of combining buffer entries in the WCB;
determining if a next launched store instruction in a combining buffer entry of the plurality of combining buffer entries is a store release instruction; and
in response to determining the next launched store instruction is a store release instruction, releasing the next launched store instruction as a store release instruction in the WCB to the memory system as a next pending store instruction for its data to be written to the non-cacheable memory, in response to lack of presence of a pending store instruction to be written to the memory system.

23. The method of clause 22, further comprising not releasing the next launched store instruction as a store release instruction in the WCB to the memory system as the next pending store instruction for its data to be written to the non-cacheable memory, in response to a presence of a pending store instruction to be written to the memory system.

24. The method of clause 22 or 23, wherein storing the launched store instruction in the combining buffer entry of the plurality of combining buffer entries comprises:
determining if the launched store instruction can be combined with an existing launched store instruction stored in a combining buffer entry of the plurality of combining buffer entries; and
in response to determining the launched store instruction can be combined with the existing launched store instruction:
causing the WCB to combine the launched store instruction with the existing launched store instruction into a combined launched store instruction in the combining buffer entry of the plurality of combining buffer entries, to store the launched store instruction in the combining buffer entry of the plurality of combining buffer entries.

25 The method of clause 24, wherein:
determining if the next launched store instruction in a combining buffer entry of the plurality of combining buffer entries is a store release instruction comprises:
determining if a next combined launched store instruction in the combining buffer entry of the plurality of combining buffer entries is a combined launched store release instruction; and
in response to determining the next launched store instruction comprising the next combined launched store instruction is a store release instruction:

releasing the combined launched store instruction in the WCB to the memory system as a next pending combined store instruction for its data to be written to the non-cacheable memory, in response to the lack of presence of a pending store instruction to be written to the memory system.

26. The method of clause 25, wherein determining if the launched store instruction can be combined with the existing launched store instruction comprises:
determining if the launched store instruction can be combined with the existing launched store instruction stored in the combining buffer entry of the plurality of combining buffer entries as a youngest launched store instruction in the WCB.

27. The method of any of clauses 24-26, further comprising, in response to determining the launched store instruction cannot be combined with the existing launched store instruction:
causing the WCB to store the launched store instruction in a new combining buffer entry of the plurality of combining buffer entries.

28. The method of any of clauses 22-27, further comprising:
determining if the launched store instruction is a store release instruction; and
in response to determining the launched store instruction is a store release instruction, the WCB further configured to:
closing the other combining buffer entries of the plurality of combining buffer entries outside of the combining buffer entry in which the launched store instruction is stored.

29 The method of any of clauses 22-28, further comprising:
determining if the next store instruction is to be written to a cacheable memory in the memory system; and
in response to determining the next store instruction is to be written to the cacheable memory, launching the next store instruction as a second launched store instruction to the non-cacheable memory to be written to the non-cacheable memory.

30 The method of clause 29, further comprising:
determining the presence of the pending store instruction to be written to the memory system; comprising:
determining the presence of a pending store instruction to be written to the non-cacheable memory; and
determining the presence of a pending store instruction to be written to the cacheable memory.

31. A processor-based system, comprising:
a processor, comprising:
an instruction processing circuit configured to:
fetch a plurality of instructions from an instruction memory, the plurality of instructions comprising a plurality of store instructions each comprising data to be written to a memory system;
execute the plurality of store instructions into a plurality of executed store instructions; and
communicate the plurality of executed store instructions to a write buffer circuit;
the memory system, comprising:
a cacheable memory; and
non-cacheable memory; and
the write buffer circuit, comprising:
a store queue (STQ) configured to:
store the plurality of executed store instructions; and
a write combining buffer (WCB) comprising a plurality of combining buffer entries;
the write buffer circuit configured to:
launch a next executed store instruction of the plurality of executed store instructions from the STQ;
determine if the next executed store instruction is to be written to the non-cacheable memory in the memory system; and
in response to determining the next executed store instruction is to be written to the non-cacheable memory, launch the next executed store instruction as a launched store instruction to the WCB; and
the WCB configured to:
store the launched store instruction in a combining buffer entry of the plurality of combining buffer entries; and
the write buffer circuit further configured to:
determine if a next launched store instruction in a combining buffer entry of the plurality of combining buffer entries is a store release instruction; and
in response to determining the next launched store instruction is a store release instruction:
release the next launched store instruction as a store release instruction in the WCB to the memory system as a next pending store instruction for its data to be written in the non-cacheable memory, in response to lack of presence of a pending store instruction to be written to the memory system; and
the memory system configured to write the released next pending store instruction to the non-cacheable memory.

32. The processor-based system of clause 31, wherein the memory system comprises the write buffer circuit.

33. The processor-based system of clause 31 or 32, wherein the memory system further comprises a memory controller coupled to the cacheable memory and the non-cacheable memory and configured to direct memory access requests for a plurality of memory access instructions of the plurality of instructions from the processor to the cacheable memory and the non-cacheable memory,
the memory controller comprising the write buffer circuit.

34 The processor-based system of any of clauses 31-33, wherein:
the memory system further comprises a non-cacheable pending store counter, the memory system further configured to update the non-cacheable pending store counter with a number of pending store instructions present to be written to the non-cacheable memory; and
the write buffer circuit is further configured to:
determine the presence of the pending store instruction to be written the non-cacheable memory by being configured to determine if the non-cacheable pending store counter indicates the presence of the pending store instruction to be written to the non-cacheable memory.

35. The processor-based system of any of clauses 31-34, wherein the write buffer circuit is further configured to:
determine if the next executed store instruction is to be written to the cacheable memory in the memory system; and
in response to determining the next executed store instruction is to be written to the cacheable memory, launch the next executed store instruction as a second launched store instruction to the non-cacheable memory to be written to the non-cacheable memory; and the memory system further configured to write the second launched store instruction to the non-cacheable memory.

36 The processor-based system of clause 35, wherein:
the memory system further comprises a cacheable pending store counter, the memory system further configured to update the cacheable pending store counter with a number of pending store instructions present to be written to the cacheable memory; and
the write buffer circuit is further configured to:
determine the presence of the pending store instruction to be written to the memory system by being configured to determine if the cacheable pending store counter indicates the presence of a pending store instruction to be written to the cacheable memory.

37 The write buffer circuit of clause 36, wherein:
the memory system further comprises a non-cacheable pending store counter, the memory system configured to update the non-cacheable pending store counter with a number of pending store instructions present to be written to the non-cacheable memory; and
the write buffer circuit is further configured to:
determine the presence of the pending store instruction to be written to the non-cacheable memory by being configured to:
determine if the non-cacheable pending store counter indicates the presence of a pending store instruction to be written to the non-cacheable memory.

38. The processor-based system of any of clauses 31-37 disposed in a system-on-a-chip (SoC).

39. The processor-based system of any of clauses 31-38 integrated into a device, the device being one of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

What is claimed is:

1. A write buffer circuit in a processor-based system, comprising:
a store queue (STQ) configured to:
store a plurality of store instructions received from a processor, each of the plurality of store instructions comprising data to be written to a memory system; and
a write combining buffer (WCB) comprising a plurality of combining buffer entries;
the write buffer circuit configured to:
launch a next store instruction of the plurality of store instructions from the STQ;
determine if the next store instruction is to be written to a non-cacheable memory in the memory system; and
in response to determining the next store instruction is to be written to the non-cacheable memory, launch the next store instruction as a launched store instruction to the WCB; and
the WCB configured to:
store the launched store instruction in a combining buffer entry of the plurality of combining buffer entries; and
the write buffer circuit further configured to:
determine if a next launched store instruction in a combining buffer entry of the plurality of combining buffer entries is a store release instruction; and
in response to determining the next launched store instruction is a store release instruction:
release the next launched store instruction as a store release instruction in the WCB to the memory system as a next pending store instruction for its data to be written to the non-cacheable memory, in response to lack of presence of a pending store instruction to be written to the memory system.

2. The write buffer circuit of claim 1, wherein the write buffer circuit is further configured to, in response to determining the next launched store instruction is a store release instruction, not release the next launched store instruction as a store release instruction in the WCB to the memory system as the next pending store instruction for its data to be written to the non-cacheable memory, in response to a presence of a pending store instruction to be written to the memory system.

3. The write buffer circuit of claim 1, configured to launch the next store instruction of the plurality of store instructions in the STQ as the launched store instruction to the WCB, regardless of the presence of a pending store instruction to be written to the memory system.

4. The write buffer circuit of claim 1, wherein the WCB is configured to store the launched store instruction in the combining buffer entry of the plurality of combining buffer entries, by being configured to:
determine if the launched store instruction can be combined with an existing launched store instruction stored in a combining buffer entry of the plurality of combining buffer entries; and
in response to determining the launched store instruction can be combined with the existing launched store instruction:
cause the WCB to combine the launched store instruction with the existing launched store instruction into a combined launched store instruction in the combining buffer entry of the plurality of combining buffer entries, to store the launched store instruction in the combining buffer entry of the plurality of combining buffer entries.

5. The write buffer circuit of claim 4, wherein the WCB is configured to determine if the launched store instruction can be combined with the existing launched store instruction by being configured to:
determine if a target address of the launched store instruction and a target address of the existing launched store instruction are contained in a common memory block in the non-cacheable memory that can be written in a single write operation.

6. The write buffer circuit of claim 4, wherein the WCB is configured to:
determine if the next launched store instruction in a combining buffer entry of the plurality of combining buffer entries is a store release instruction by being configured to:
determine if a next combined launched store instruction in the combining buffer entry of the plurality of combining buffer entries is a combined launched store release instruction; and in response to determining the next launched store instruction comprising the next combined launched store instruction is a store release instruction:
release the combined launched store instruction in the WCB to the memory system as the next pending combined store instruction for its data to be written to the non-cacheable memory, in response to lack of presence of a pending store instruction to be written to the memory system.

7. The write buffer circuit of claim 6 configured to determine if the launched store instruction can be combined with the existing launched store instruction by being configured to:
determine if the launched store instruction can be combined with the existing launched store instruction stored in the combining buffer entry of the plurality of combining buffer entries as a youngest launched store instruction in the WCB.

8. The write buffer circuit of claim 4 further configured to, in response to determining the launched store instruction cannot be combined with the existing launched store instruction:
cause the WCB to store the launched store instruction in a new combining buffer entry of the plurality of combining buffer entries.

9. The write buffer circuit of claim 1, further configured to:
determine if the launched store instruction is a store release instruction; and
in response to determining the launched store instruction is a store release instruction, the WCB further configured to:
close the other combining buffer entries of the plurality of combining buffer entries outside of the combining buffer entry in which the launched store instruction is stored.

10. The write buffer circuit of claim 1 further configured to determine the presence of a pending store instruction to be written to the memory system.

11. The write buffer circuit of claim 10 configured to determine the presence of a pending store instruction to be written to the memory system by being configured to determine the presence of the pending store instruction to be written to the non-cacheable memory.

12. The write buffer circuit of claim 11 configured to:
determine the presence of the pending store instruction to be written to the non-cacheable memory, by being configured to determine if a non-cacheable pending store counter indicates the presence of a pending store instruction to be written to the non-cacheable memory.

13. The write buffer circuit of claim 10 further configured to:
determine if the next store instruction is to be written to a cacheable memory in the memory system; and
in response to determining the next store instruction is to be written to the cacheable memory, launch the next store instruction as a second launched store instruction to the cacheable memory to be written to the cacheable memory.

14. The write buffer circuit of claim 13 configured to determine the presence of a pending store instruction to be written to the memory system by being configured to determine the presence of the pending store instruction to be written to the cacheable memory.

15. The write buffer circuit of claim 14 configured to: determine the presence of the pending store instruction to be written to the cacheable memory, by being configured to determine if a cacheable pending store counter indicates the presence of a pending store instruction to be written to the cacheable memory.

16. The write buffer circuit of claim 14 configured to determine the presence of the pending store instruction to be written to the memory system, by being configured to:
determine the presence of a pending store instruction to be written to the non-cacheable memory; and
determine the presence of a pending store instruction to be written to the cacheable memory.

17. The write buffer circuit of claim 1, further configured to, in response to determining the next launched store instruction is not a store release instruction:
release the next launched store instruction in the WCB to the memory system as the next pending store instruction for its data to be written to the non-cacheable memory.

18. The write buffer circuit of claim 1 configured to release the next launched store instruction to the memory system by being configured to release an oldest next launched store instruction in the WCB to the memory system.

19. The write buffer circuit of claim 1, wherein:
the STQ is configured to store the plurality of store instructions received from the processor in order from an oldest received store instruction to a youngest received store instruction; and
the write buffer circuit is configured to launch the next store instruction of the plurality of store instructions in the STQ as the oldest received store instruction in the STQ.

20. The write buffer circuit of claim 1, further comprising a release circuit coupled to the WCB, the release circuit configured to:
determine if the next launched store instruction in the combining buffer entry of the plurality of combining buffer entries is the store release instruction; and
in response to determining the next launched store instruction is the store release instruction:
release the next launched store instruction as the store release instruction in the WCB to the memory system as the next pending store instruction for its data to be written to the non-cacheable memory, in response to the lack of presence of a pending store instruction to be written to the memory system.

21. The write buffer circuit of claim 1 integrated into a device, the device being one of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. A method of combining store release instructions to be written to memory in a processor-based system, comprising:
storing a plurality of store instructions received from an instruction processing circuit of a processor in a store queue (STQ), each of the plurality of store instructions comprising data to be written to a memory system;

launching a next store instruction of the plurality of store instructions from the STQ;
determining if the next store instruction is to be written to a non-cacheable memory in the memory system;
launching the next store instruction as a launched store instruction to a write combining buffer (WCB) in response to determining the next store instruction is to be written to the non-cacheable memory;
storing the launched store instruction in a combining buffer entry of a plurality of combining buffer entries in the WCB;
determining if a next launched store instruction in a combining buffer entry of the plurality of combining buffer entries is a store release instruction; and
in response to determining the next launched store instruction is a store release instruction, releasing the next launched store instruction as a store release instruction in the WCB to the memory system as a next pending store instruction for its data to be written to the non-cacheable memory, in response to lack of presence of a pending store instruction to be written to the memory system.

23. The method of claim 22, further comprising not releasing the next launched store instruction as a store release instruction in the WCB to the memory system as the next pending store instruction for its data to be written to the non-cacheable memory, in response to a presence of a pending store instruction to be written to the memory system.

24. The method of claim 22, wherein storing the launched store instruction in the combining buffer entry of the plurality of combining buffer entries comprises:
determining if the launched store instruction can be combined with an existing launched store instruction stored in a combining buffer entry of the plurality of combining buffer entries; and
in response to determining the launched store instruction can be combined with the existing launched store instruction:
causing the WCB to combine the launched store instruction with the existing launched store instruction into a combined launched store instruction in the combining buffer entry of the plurality of combining buffer entries, to store the launched store instruction in the combining buffer entry of the plurality of combining buffer entries.

25. The method of claim 24, wherein:
determining if the next launched store instruction in a combining buffer entry of the plurality of combining buffer entries is a store release instruction comprises:
determining if a next combined launched store instruction in the combining buffer entry of the plurality of combining buffer entries is a combined launched store release instruction; and
in response to determining the next launched store instruction comprising the next combined launched store instruction is a store release instruction:
releasing the combined launched store instruction in the WCB to the memory system as a next pending combined store instruction for its data to be written to the non-cacheable memory, in response to the lack of presence of a pending store instruction to be written to the memory system.

26. The method of claim 25, wherein determining if the launched store instruction can be combined with the existing launched store instruction comprises:
determining if the launched store instruction can be combined with the existing launched store instruction stored in the combining buffer entry of the plurality of combining buffer entries as a youngest launched store instruction in the WCB.

27. The method of claim 24, further comprising, in response to determining the launched store instruction cannot be combined with the existing launched store instruction:
causing the WCB to store the launched store instruction in a new combining buffer entry of the plurality of combining buffer entries.

28. The method of claim 22, further comprising:
determining if the launched store instruction is a store release instruction; and
in response to determining the launched store instruction is a store release instruction, the WCB further configured to:
closing the other combining buffer entries of the plurality of combining buffer entries outside of the combining buffer entry in which the launched store instruction is stored.

29. The method of claim 22, further comprising:
determining if the next store instruction is to be written to a cacheable memory in the memory system; and
in response to determining the next store instruction is to be written to the cacheable memory, launching the next store instruction as a second launched store instruction to the non-cacheable memory to be written to the non-cacheable memory.

30. The method of claim 29, further comprising:
determining the presence of the pending store instruction to be written to the memory system; comprising:
determining the presence of a pending store instruction to be written to the non-cacheable memory; and
determining the presence of a pending store instruction to be written to the cacheable memory.

31. A processor-based system, comprising:
a processor, comprising:
an instruction processing circuit configured to:
fetch a plurality of instructions from an instruction memory, the plurality of instructions comprising a plurality of store instructions each comprising data to be written to a memory system;
execute the plurality of store instructions into a plurality of executed store instructions; and
communicate the plurality of executed store instructions to a write buffer circuit;
the memory system, comprising:
a cacheable memory; and
non-cacheable memory; and
the write buffer circuit, comprising:
a store queue (STQ) configured to:
store the plurality of executed store instructions; and
a write combining buffer (WCB) comprising a plurality of combining buffer entries;
the write buffer circuit configured to:
launch a next executed store instruction of the plurality of executed store instructions from the STQ;
determine if the next executed store instruction is to be written to the non-cacheable memory in the memory system; and
in response to determining the next executed store instruction is to be written to the non-cacheable memory, launch the next executed store instruction as a launched store instruction to the WCB; and the WCB configured to:
store the launched store instruction in a combining buffer entry of the plurality of combining buffer entries; and
the write buffer circuit further configured to:
determine if a next launched store instruction in a combining buffer entry of the plurality of combining buffer entries is a store release instruction; and
in response to determining the next launched store instruction is a store release instruction:
release the next launched store instruction as a store release instruction in the WCB to the memory system as a next pending store instruction for its data to be written in the non-cacheable memory, in response to lack of presence of a pending store instruction to be written to the memory system; and
the memory system configured to write the released next pending store instruction to the non-cacheable memory.

32. The processor-based system of claim 31, wherein the memory system comprises the write buffer circuit.

33. The processor-based system of claim 31, wherein the memory system further comprises a memory controller coupled to the cacheable memory and the non-cacheable memory and configured to direct memory access requests for a plurality of memory access instructions of the plurality of instructions from the processor to the cacheable memory and the non-cacheable memory,
the memory controller comprising the write buffer circuit.

34. The processor-based system of claim 31, wherein:
the memory system further comprises a non-cacheable pending store counter, the memory system further configured to update the non-cacheable pending store counter with a number of pending store instructions present to be written to the non-cacheable memory; and
the write buffer circuit is further configured to:
determine the presence of the pending store instruction to be written the non-cacheable memory by being configured to determine if the non-cacheable pending store counter indicates the presence of the pending store instruction to be written to the non-cacheable memory.

35. The processor-based system of claim 31, wherein the write buffer circuit is further configured to:
determine if the next executed store instruction is to be written to the cacheable memory in the memory system; and
in response to determining the next executed store instruction is to be written to the cacheable memory, launch the next executed store instruction as a second launched store instruction to the non-cacheable memory to be written to the non-cacheable memory; and
the memory system further configured to write the second launched store instruction to the non-cacheable memory.

36. The processor-based system of claim 35, wherein:
the memory system further comprises a cacheable pending store counter, the memory system further configured to update the cacheable pending store counter with a number of pending store instructions present to be written to the cacheable memory; and
the write buffer circuit is further configured to:
determine the presence of the pending store instruction to be written to the memory system by being configured to determine if the cacheable pending store counter indicates the presence of a pending store instruction to be written to the cacheable memory.

37. The write buffer circuit of claim 36, wherein:
the memory system further comprises a non-cacheable pending store counter, the memory system configured to update the non-cacheable pending store counter with a number of pending store instructions present to be written to the non-cacheable memory; and
the write buffer circuit is further configured to:
determine the presence of the pending store instruction to be written to the non-cacheable memory by being configured to:
determine if the non-cacheable pending store counter indicates the presence of a pending store instruction to be written to the non-cacheable memory.

38. The processor-based system of claim 31 disposed in a system-on-a-chip (SoC).

39. The processor-based system of claim 31 integrated into a device, the device being one of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *